United States Patent [19]
Woodgate et al.

[11] Patent Number: 6,055,103
[45] Date of Patent: Apr. 25, 2000

[54] PASSIVE POLARISATION MODULATING OPTICAL ELEMENT AND METHOD OF MAKING SUCH AN ELEMENT

[75] Inventors: Graham John Woodgate, Henley-on-Thames; Adrian Marc Simon Jacobs, Headington; Jonathan Harrold, Oxford; Richard Robert Moseley, Horsham; David Ezra, Wallingford, all of United Kingdom

[73] Assignee: Sharp Kabushiki Kaisha, Osaka, Japan

[21] Appl. No.: 09/105,472

[22] Filed: Jun. 26, 1998

Related U.S. Application Data

[63] Continuation-in-part of application No. 08/928,891, Sep. 12, 1997.

[30] Foreign Application Priority Data

Jun. 28, 1997 [GB] United Kingdom .................... 9713627
Mar. 3, 1998 [GB] United Kingdom .................... 9804500

[51] Int. Cl.$^7$ ....................................... G02B 5/30
[52] U.S. Cl. .......................... 359/494; 349/124; 349/129; 359/497
[58] Field of Search ................... 349/123, 124, 349/125, 129; 359/494, 483, 485, 497

[56] References Cited

U.S. PATENT DOCUMENTS

| | | | |
|---|---|---|---|
| 2,631,496 | 3/1953 | Rehorn | 88/29 |
| 2,647,440 | 8/1953 | Rehorn | 88/65 |
| 4,974,941 | 12/1990 | Gibbons et al. | 350/349 |
| 5,049,427 | 9/1991 | Starzewski et al. | 428/40 |
| 5,264,964 | 11/1993 | Faris | 359/465 |
| 5,327,285 | 7/1994 | Faris | 359/483 |
| 5,537,144 | 7/1996 | Faris | 348/58 |
| 5,909,265 | 6/1999 | Kim et al. | 349/129 |

FOREIGN PATENT DOCUMENTS

| | | |
|---|---|---|
| 0602934 | 6/1994 | European Pat. Off. . |
| 0625861 | 11/1994 | European Pat. Off. . |
| 0656560 | 6/1995 | European Pat. Off. . |
| 0721131 | 7/1996 | European Pat. Off. . |
| 0726482 | 8/1996 | European Pat. Off. . |
| 0829744 | 3/1998 | European Pat. Off. . |
| 0860728 | 8/1998 | European Pat. Off. . |
| 2286058 | 8/1995 | United Kingdom . |
| 2306231 | 4/1997 | United Kingdom . |

OTHER PUBLICATIONS

Search Report for Application No. 98305123.6–2205–; Dated Nov. 30, 1998.

Schadt et al.; Jpn. J. Appl. Phys., vol. 34 (1995), pp. L764–L767, Part 2, No. 6B, Jun. 15, 1995, "Photo–Induced Alignment and Pattering of Hybrid Liquid Crystalline Polymer Films on Single Substrates".

(List continued on next page.)

Primary Examiner—Cassandra Spyrou
Assistant Examiner—Craig Curtis

[57] ABSTRACT

A passive polarisation modulating optical element comprises a layer of birefringent material. The layer has substantially fixed birefringence and comprises retarder regions forming a regular pattern, for instance to act as a parallax barrier for a 3D display. The retarders have optic axes aligned in different directions from each other. The element may be associated with a polariser, for instance an output polariser of a liquid crystal device, with the polarising direction of the polariser being parallel to the optic axis of the retarders. Thus, the retarders have no effect on the intensity of light passing through the element whereas the retarders act as half waveplates and rotate the polarisation vector of light passing therethrough, for instance by 90°.

23 Claims, 24 Drawing Sheets

OTHER PUBLICATIONS

Search Report for Application No. GB 9804500.8; Dated Jun. 22, 1998.

M. Schadt, SID Information Display, Dec. 1997, pp. 14–18, 1997, "Photo–Alignment and Patterning of Liquid–Crystal Displays".

C. van Berkel et al., SPIE, vol. 3012, pp. 179–186, 1997, "Characterisation and Optimisation of 3D–LCD Module Design".

U.S. Pending Application Serial No. 08/573,155, filed on Dec. 15, 1995.

Search Report for Application No. GB 9713627.9; Dated Oct. 3, 1997.

Y. Kato et al., Japanese Laid–Open Publication No. 63–158525, Laid Open on Jul. 1, 1988 with English translation.

M. Tani et al., SID Oct. 10–13 Monterey, pp. 103–111, 1994, "Progress in Color Filters for LCDs".

M. Schadt et al., Japanese Journal of Applied Physics, vol. 31, pp. 2155–2164, 1992, "Surface–Induced Parallel Alignment of Liquid Crystals".

D.J. Broer, SID 95 Digest, pp. 165–168, 1995, "Invited Paper: Molecular Architectures in Thin Plastic Films By Insitu Photopolymerization of Reactive Liqjid Crystals".

S. Pancharatnam, The Proceedings Of The Indian Academy of Sciences, vol. XLI, No. 4, Sec. A, pp. 130–136, 1995, "Achromatic Combinations Of Birefringent Plates".

J.B. Eichenlaub, SPIE, vol. 2177, pp. 4–15, 1994, "An Autostereoscopic Display With High Brightness and Power Efficiency".

E. Nakayama et al., Proc. Third Internal Display Workshops, vol. 2, pp. 453–456, 1996, "2–D/3–D Compatible LC Display without Special Glasses".

J. Chen et al., SID 95 Digest, pp. 865–868, 1995, "Four Domain TN–LCD Fabricated By Reverse Rubbing or Double Evaporation".

Mask appearance 20
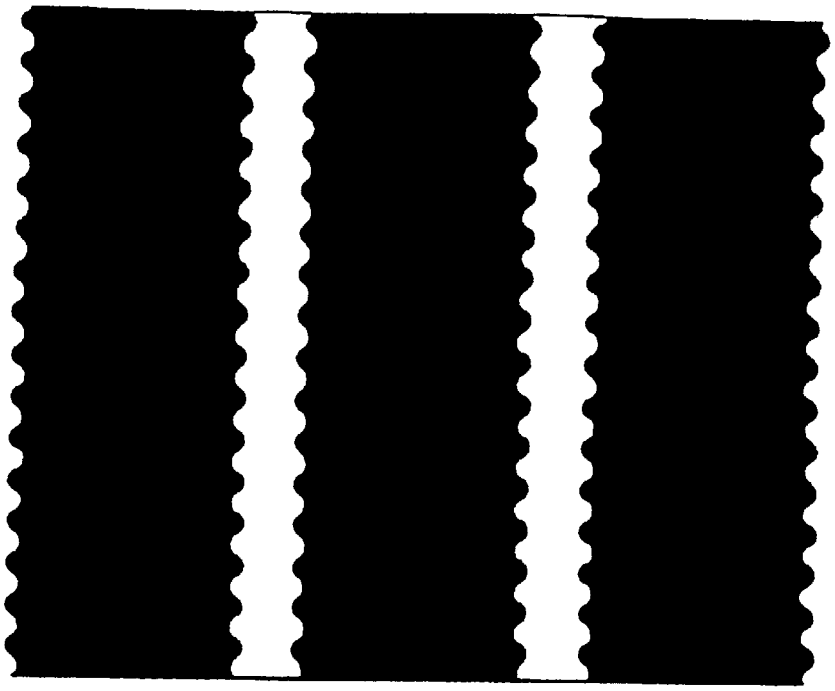
Alignment layer orientation 21
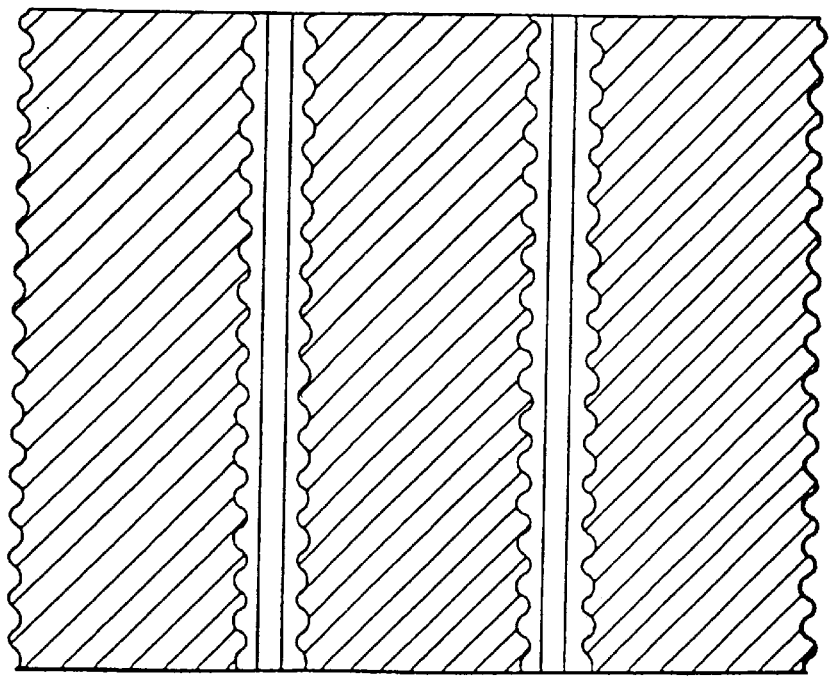
FIG 12

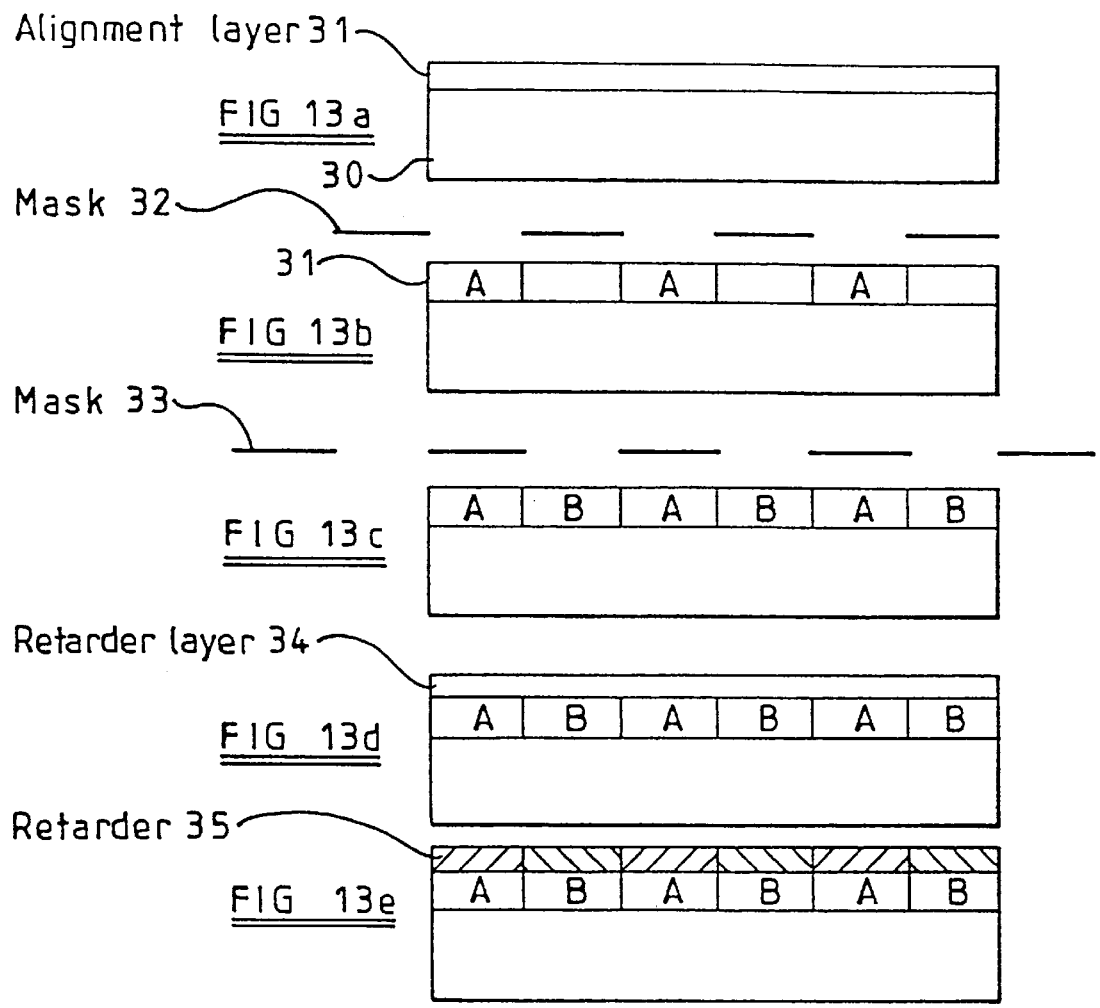

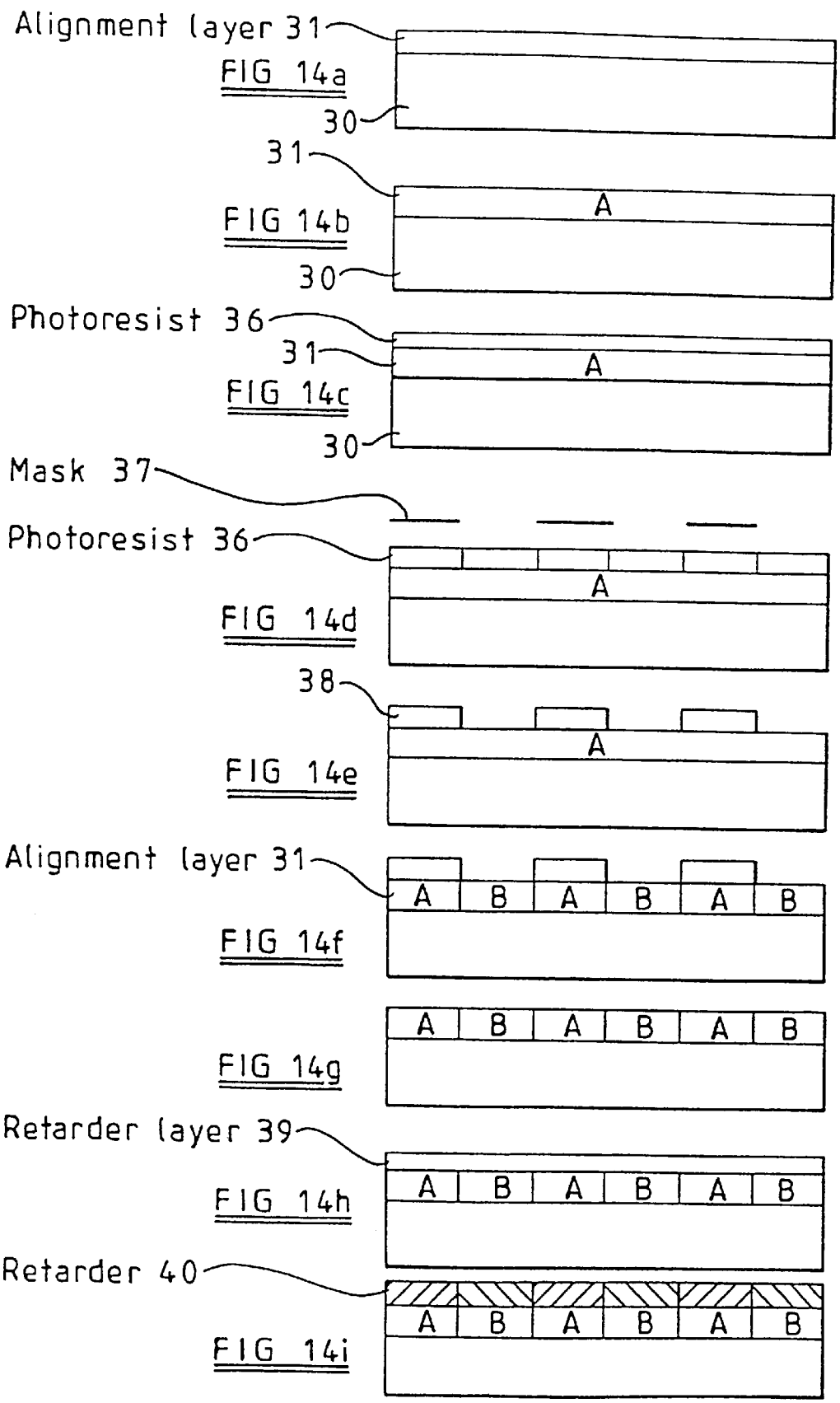

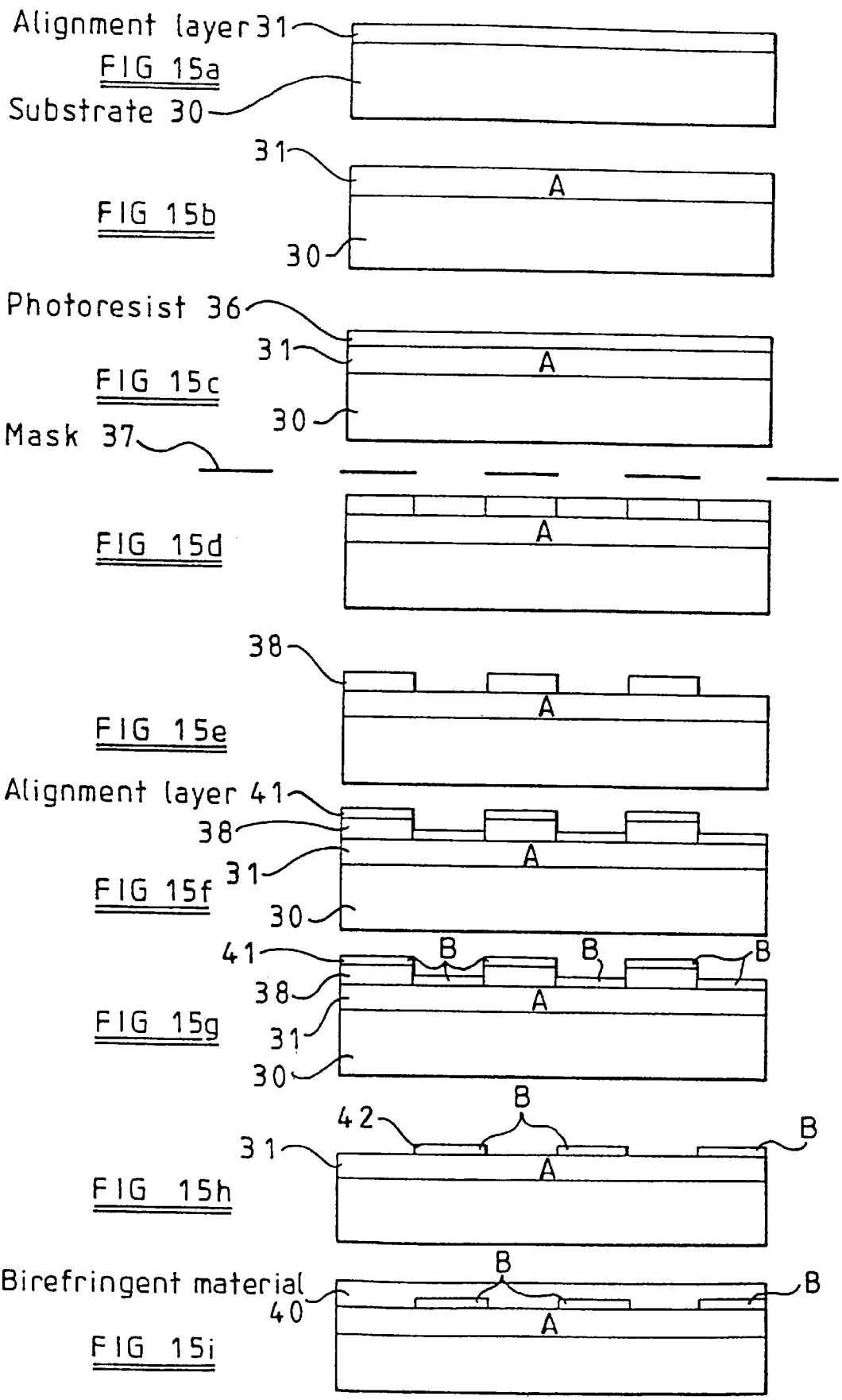

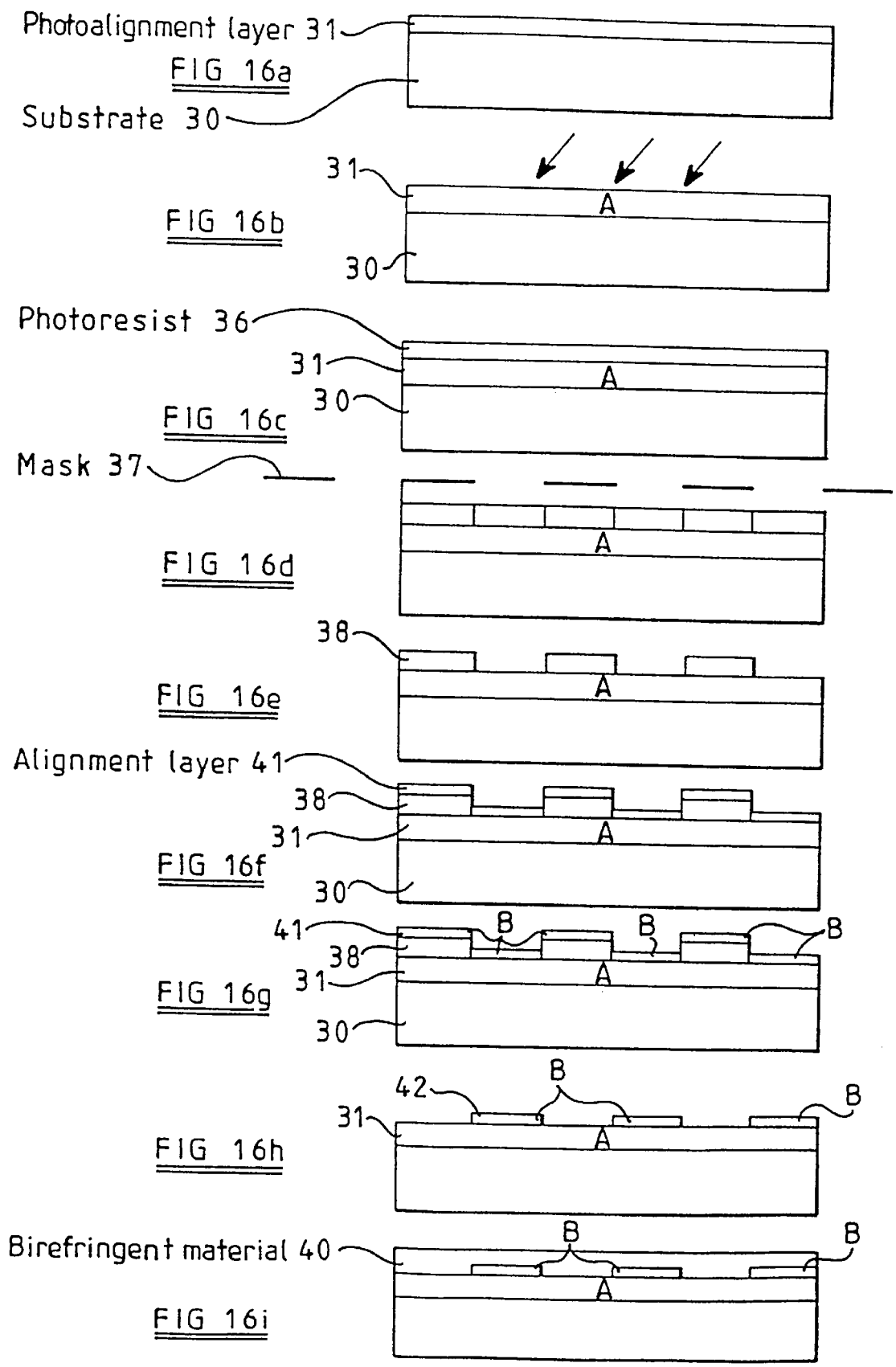

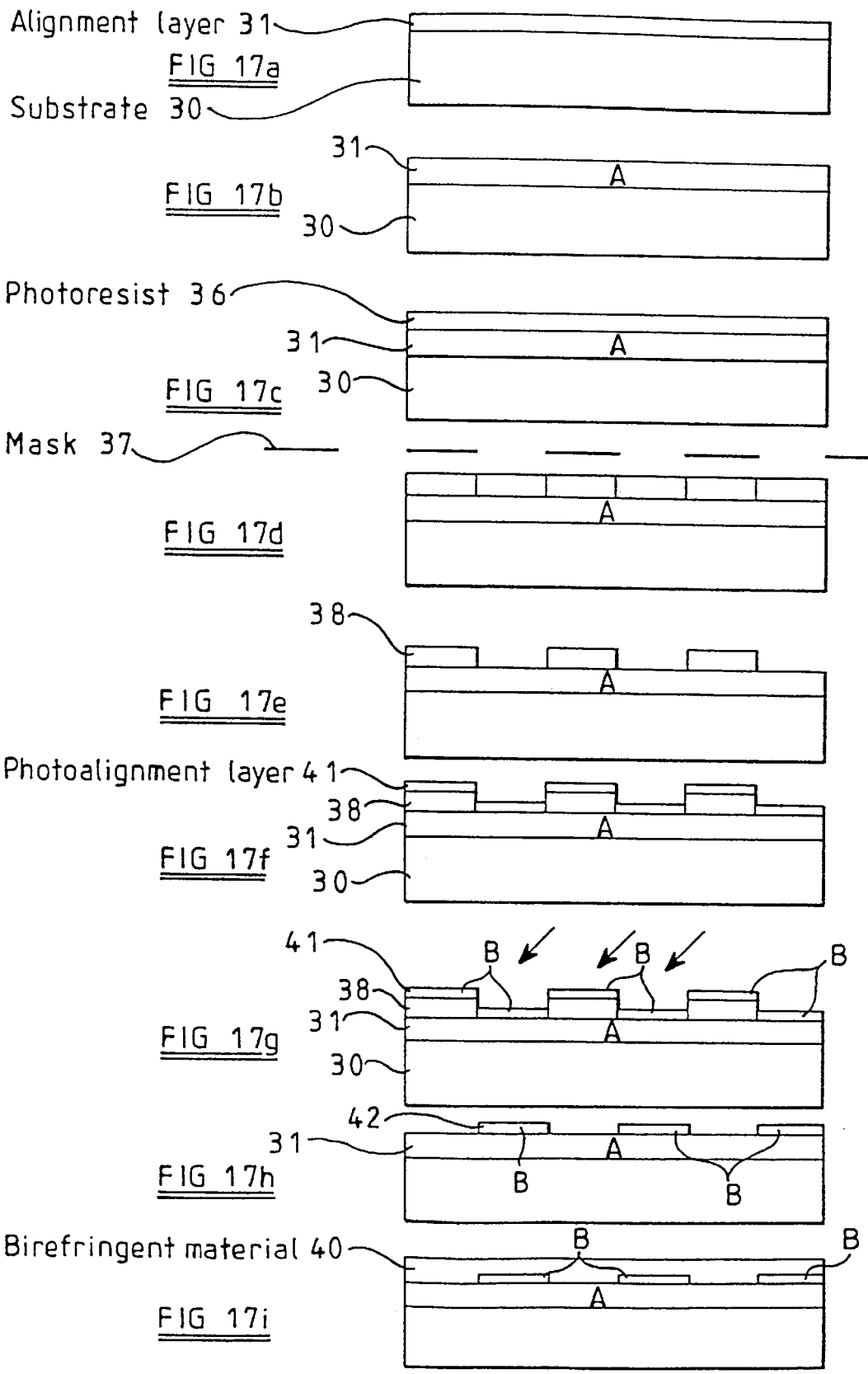

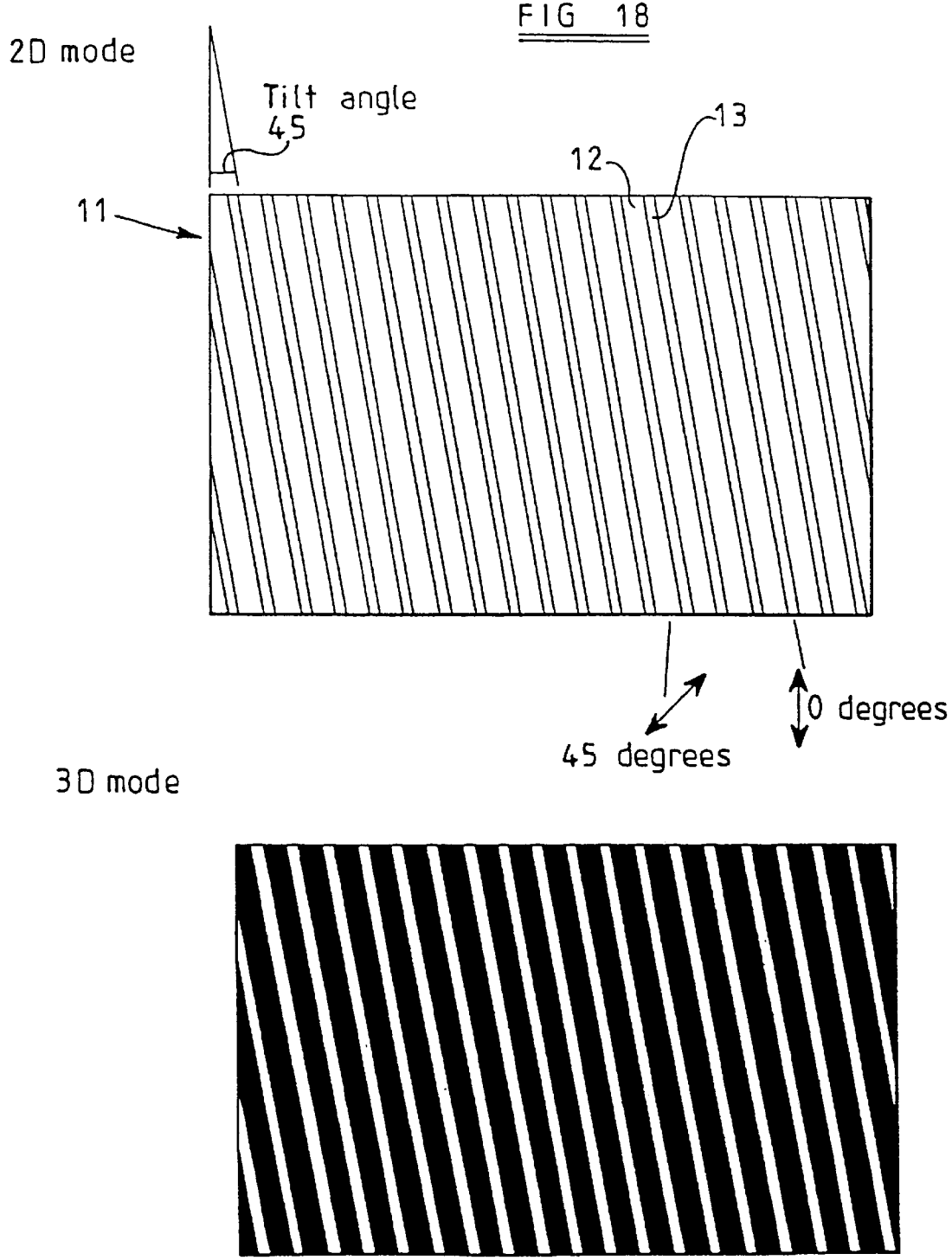

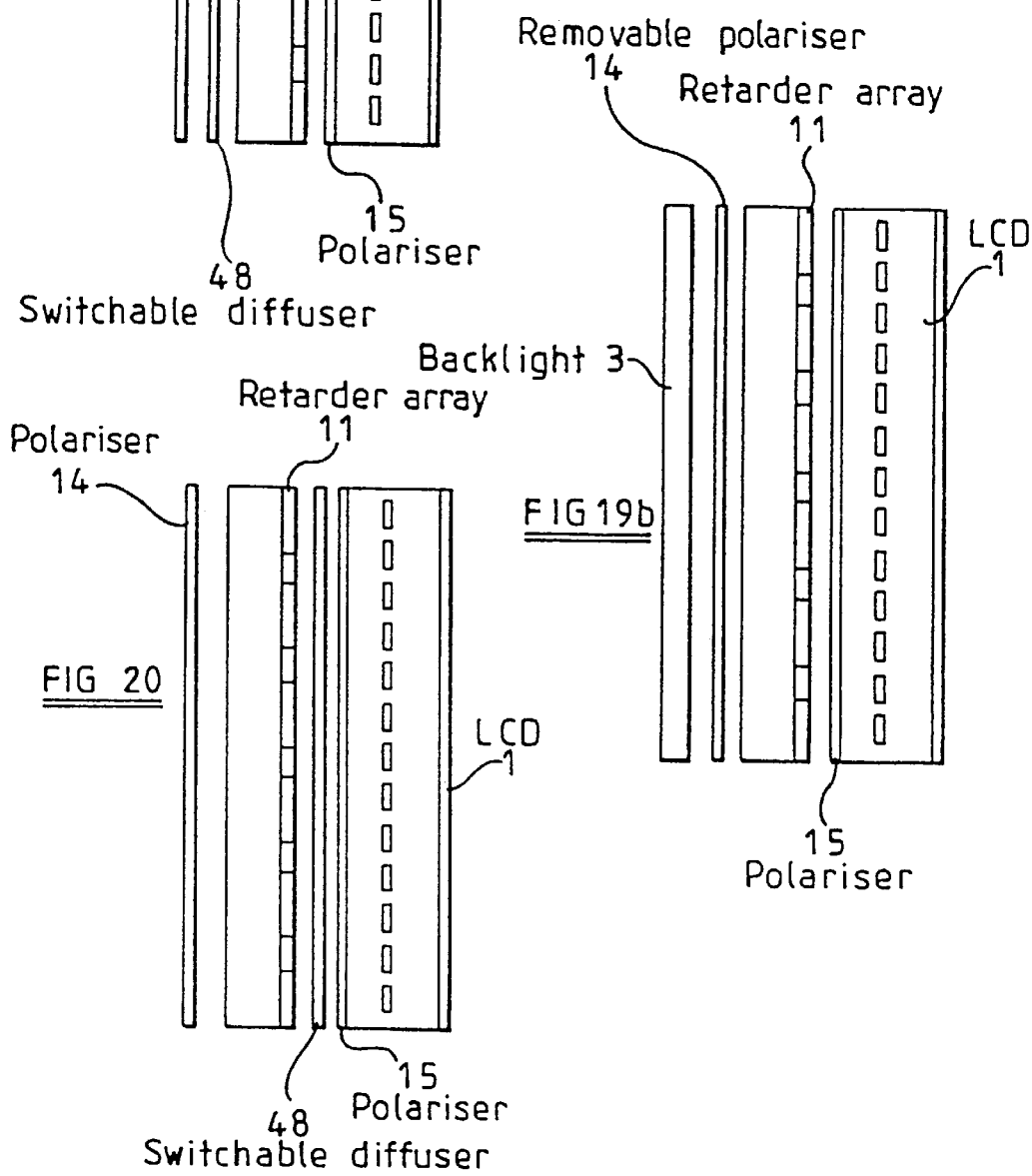

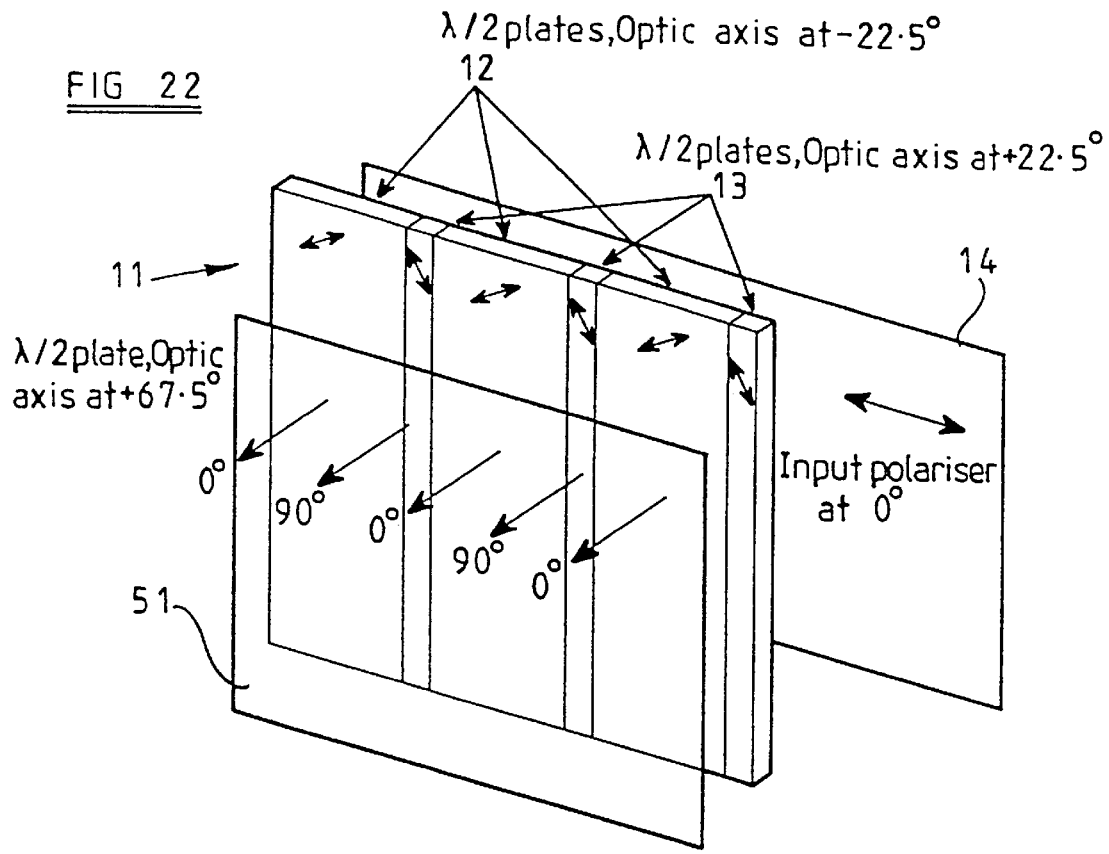
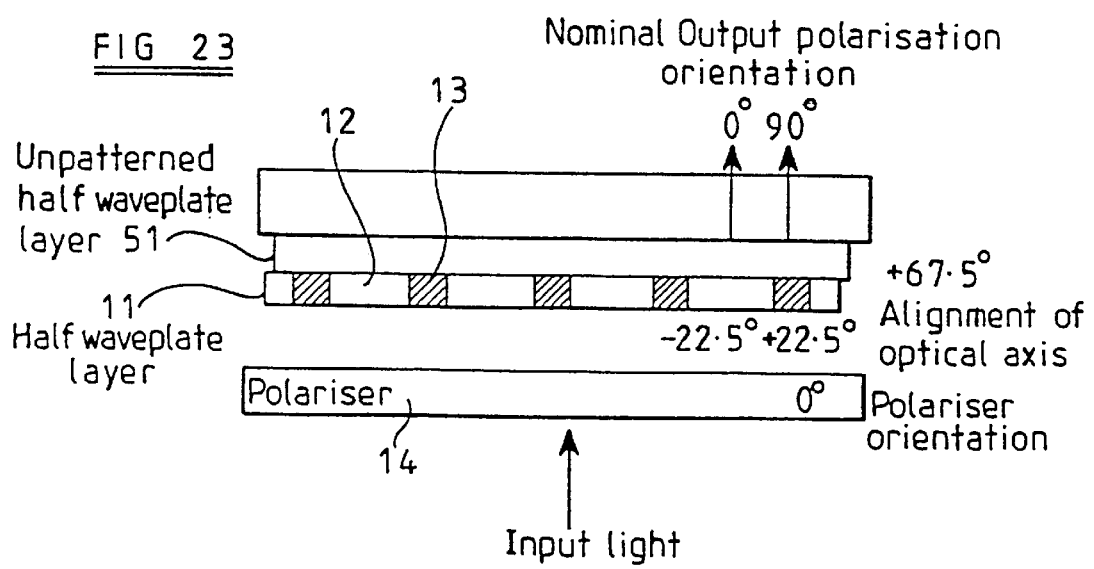

PASSIVE POLARISATION MODULATING OPTICAL ELEMENT AND METHOD OF MAKING SUCH AN ELEMENT

This application is a continuation-in-part of U.S. application Ser. No. 08/928,891, filed Sep. 12, 1997. The disclosure in the prior application is incorporated herein by reference in its entirety.

The present invention relates to a passive polarisation modulating optical element and to an optical device including such an element. The present invention also relates to a method of making a passive polarisation modulating optical element. Such an element may be used in three dimensional (3D) displays, for instance of the autostereoscopic type. Such displays may be used in games apparatuses, computer monitors, laptop displays, work stations and professional imaging, for instance for medical, design or architectural use.

In normal vision, the two human eyes perceive views of the world from two different perspectives due to their spatial separation within the head. These two perspectives are then used by the brain to assess the distance to various objects in a scene. In order to provide a display which effectively displays a 3D image, it is necessary to recreate this situation and supply a so-called "stereoscopic pair" of images, one to each eye of an observer.

Most 3D displays may be classified into two types depending on the technique used to supply the different views to the eyes. Stereoscopic displays typically display both of the images with a wide viewing freedom. However, each of the views is encoded, for instance by colour, polarisation state or time of display, so that a filter system of glasses worn by the observer attempts to separate the views to let each eye see only the view that is intended for it.

Autostereoscopic displays require no viewing aids to be worn by the observer. Instead, the two views are only visible from defined regions of space. The region of space in which an image is visible across the whole of the display active area is termed a "viewing region". If the observer is situated such that one eye is in one viewing region and the other eye is in the other viewing region, then a correct set of views is seen and a 3D image is perceived.

For autostereoscopic displays of the "flat panel" type, the viewing regions are formed by a combination of the picture element (pixel) structure of the display and an optical element, generically termed a parallax optic. An example of such an optic is a parallax barrier. This element is a screen with vertical transmissive slits separated by opaque regions. A display of this type is illustrated in FIG. 1 of the accompanying drawings. A spatial light modulator (SLM) 1 of the liquid crystal type comprises glass substrates 2 between which are disposed a liquid crystal layer together with associated electrodes and alignment layers. A backlight 3 illuminates the SLM 1 from behind and a parallax barrier 4 is disposed on the front surface of the SLM 1.

The SLM 1 comprises a two dimensional (2D) array of pixel apertures with the pixels arranged as columns as shown at 5 separated by gaps 6. The parallax barrier 4 has vertically extending slits 7 with a horizontal pitch close to an integer multiple of the horizontal pitch of the pixel columns 5 so that groups of columns of pixels are associated with each slit. As illustrated in FIG. 1, three pixel columns labelled columns 1, 2 and 3 are associated with each slit 7 of the parallax barrier 4.

The function of the parallax optic such as the parallax barrier 4 is to restrict the light transmitted through the pixels to certain output angles. This restriction defines the angle of view of each of the pixel columns behind the associated slit. The angular range of view of each pixel is determined by the pixel width and the separation between planes containing the pixels and the parallax optic. As shown in FIG. 1, the three columns 5 associated with each slit 7 are visible in respective viewing windows.

FIG. 2 of the accompanying drawings illustrates the angular zones of light created from an SLM 1 and a parallax barrier 4 where the parallax barrier slits have a horizontal pitch equal to an exact integer multiple of the pixel column pitch. In this case, the angular zones coming from different locations across the display surface intermix and a pure zone of view for image 1 or image 2 does not exist. Thus, each eye of an observer will not see a single image across the whole of the display but instead will see slices of different images at different regions on the display surface. In order to overcome this problem, the pitch of the parallax optic is reduced slightly so that the angular zones converge at a predetermined plane, generally known as the "window plane", in front of the display. This change in the parallax optic pitch is termed "viewpoint correction" and is illustrated in FIG. 3 of the accompanying drawings. The window plane is shown at 8 and the resulting substantially kite shaped viewing regions are shown at 9 and 10. Provided the left and right eyes of the observer remain in the viewing regions 9 and 10, respectively, each eye will see the single image intended for it across the whole of the display so that the observer will perceive the 3D effect.

The window plane 8 defines the optimum viewing distance of the display. An observer whose eyes are located in this plane receives the best performance of the display. As the eyes move laterally in this plane, the image on the display remains until the eyes reach the edge of the viewing regions 9 and 10, whereupon the whole display swiftly changes to the next image as one eye moves into the adjacent viewing region. The line of the window plane within each viewing region is generally termed a "viewing window".

"Molecular architectures in thin plastic films by in-situ photopolymerisation of reactive liquid crystals" D. J. Broer SID 95 Digest discloses a method of making patterned optical waveplates.

"Surface induced parallel alignment of liquid crystals by linearly polymerised photopolymers" Schadt et al Japanese Journal of Applied Physics, vol 31, 1992, pp 2155 discloses a technique based on the photopolymerisation of liquid crystal alignment layers including non-contact alignment of liquid crystals obtained by crosslinking polyvinylmethoxycinnamate using polarised light.

"Photo-alignment and Patterning of LC Displays" Schadt SID Information Display 12/97 discloses photo-patterning of alignment layers for liquid crystals requiring only one masking step.

EP 0 689 084 discloses the use of reactive mesogen layers as optical elements and alignment surfaces.

U.S. Pat. No. 5,537,144 and U.S. Pat. No. 5,327,285 disclose photolithographic techniques of patterning polarisers or retarders. An array of retarders is generated by etching a stretched film of PVA through a photoresist. This selectively removes PVA and therefore effectively destroys the birefringence in certain regions. Selective mechanical removal of PVA is also described. Thus, such a technique may be used to provide a single layer element in which some regions act as retarders with the optic axes parallel to each other and other regions have substantially zero retardance.

"Four domain TNLCD fabricated by reverse rubbing or double evaporation" Chen et al SID 95 Digest page 865 discloses the use of a technique involving double-rubbing of an alignment layer in an active liquid crystal device (LCD). The liquid crystal alignment direction varies within each pixel to enable improved viewing angle performance of the device.

According to a first aspect of the invention, there is provided a passive polarisation modulating optical element characterised by comprising: an alignment layer comprising at least one first region having a first alignment direction and at least one second region having a second alignment direction different from the first alignment direction; and a layer of birefringent material disposed on and aligned by the alignment layer, the birefringent layer having substantially fixed magnitude of birefringence and comprising at least one first retarder overlying the at least one first region and having an optic axis aligned in a first direction and at least one second retarder overlying the at least one second region and having an optic axis aligned in a second direction different from the first direction.

The at least one first retarder may comprise a plurality of first retarders, the at least one second retarder may comprise a plurality of second retarders, and the first and second retarders may be arranged as a regular array. The first and second retarders may comprise first and second strips which alternate with each other. The first strips may have a first width and the second strips may have a second width less than the first width.

The first and second retarders may have a retardance of $(2m+1)\lambda/2$ between propagation along the fast and slow axes, where m is an integer and $\lambda$ is a wavelength of light, such as infrared, visible or ultraviolet light.

The second direction may be at substantially 45° to the first direction.

The birefringent material may comprise at least one crosslinkable liquid crystal monomer, at least one crosslinkable liquid crystal oligomer, or a mixture thereof. For example, the birefringent material may comprise a reactive mesogen. Crosslinking may be means of heat, irradiation such as ultraviolet irradiation, or cationic polymerisation.

According to a second aspect of the invention, there is provided an optical device characterised by comprising an element according to the first aspect of the invention and a linear polariser for passing light polarised at a predetermined angle with respect to the first optic axis.

The predetermined angle may be substantially equal to 0° or 90°.

The polariser may comprise part of a further device. The further device may be a liquid crystal device. The liquid crystal device may comprise first and second substrates and a liquid crystal layer, the optical element may be disposed between the first substrate and the liquid crystal layer, a third substrate may be disposed between the optical element and the liquid crystal layer, and the third substrate may be substantially thinner than the first substrate.

According to a third aspect of the invention, there is provided a method of making a passive polarisation modulating optical element, comprising forming an alignment layer, providing at least one first region of the alignment layer with a first alignment direction, providing at least one second region of the alignment layer with a second alignment direction different from the first alignment direction, disposing on the alignment layer a layer of birefringent material whose optic axis is aligned by the alignment layer, and fixing the optic axis of the birefringent layer.

The at least one first region may comprise a plurality of first regions, the at least one second region may comprise a plurality of second regions, and the first and second regions may be arranged as a regular array. The first and second regions may comprise first and second strips which alternate with each other. The first strips may have a first width and the second strips may have a second width less than the first width.

The birefringent layer may have a thickness for providing a retardance of $(2n+1)\lambda/2$, between propagation along the fast and slow axes, where n is an integer and $\lambda$ is a wavelength of light, such as infrared, visible or ultraviolet light.

The second direction may be substantially at 45° to the first direction.

The birefringent material may comprise at least one crosslinkable liquid crystal monomer, at least one crosslinkable liquid crystal oligomer, or a mixture thereof. For example, the birefringent material may comprise a reactive mesogen. Crosslinking may be by means of heat, irradiation such as ultraviolet irradiation, or cationic polymerisation.

The fixing may be performed by irradiation, such as ultraviolet irradiation.

The alignment layer may comprise polyimide.

The alignment layer may comprise a linearly photopolymerisable polymer, the alignment layer may be masked to reveal the or each first region, the or each first region may be exposed to radiation having a first linear polarisation, the alignment layer may be masked to reveal the or each second region, and the or each second region may be exposed to radiation having a second linear polarisation different from the first linear polarisation.

The alignment layer may comprise a linearly photopolymerisable polymer, the alignment layer may be masked to reveal the or each first region, the or each first region may be exposed to radiation having a first linear polarisation, the alignment layer may be unmasked, and the or each first region and the or each second region may be exposed to radiation having a second linear polarisation different from the first linear polarisation. The alignment direction of the or each first region remains substantially unaffected by the second exposure to radiation.

Masking may be formed of photoresist. For instance, a positive or negative photoresist may be initially spun or coated by other known means and then exposed image-wise through a mask, for example in a "mask aligner", before the unwanted portion of the photoresist is stripped off to leave a masking pattern of photoresist.

Such an optical element may be used, for instance, to provide a parallax barrier which may be used in an autostereoscopic display and whose parallax barrier operation may be disabled to permit such a display to be used in a two dimensional (2D) mode. A device of this type is disclosed in British patent application No: 9713985.1. When in the 2D mode, it is advantageous to avoid any difference in light absorption between the regions which act as the slits in the 3D mode and the regions between the slits. Otherwise, in the 2D mode, visible Moire patterning could be produced by beating of the variation in absorption with the pixel structure of the display.

The element may be bonded to another substrate so as to avoid damage to its surface without affecting the optical properties of the element. The element may be formed on a glass substrate which allows the application of a low-cost anti-reflection layer on the opposite substrate surface prior to making the element.

The optical element may be manufactured using existing processes, such as spin coating and photolithographic masking techniques. Thus, optical elements of this type may be manufactured in high volume at low cost. The element is manufactured without the removal of retarder material and so can be more easily made without introducing surface or edge artefacts or damage and without requiring subsequent planarisation. By using photolithographic techniques, the retarder regions may be formed with high accuracy and resolution so that such an element is suitable for use in a viewpoint corrected parallax barrier. Further, it is possible to provide an element having high levels of dimensional stability.

The substrate may have substantially the same thermal expansion properties as a display substrate.

The invention will be further described, by way of example, with reference to the accompanying drawings, in which:

FIG. 12 illustrates an alignment layer orientation and mask appearance for a parallax barrier constituting an embodiment of te invention and providing reduced diffraction by spatial modulation of slit edges;

Figure 4:
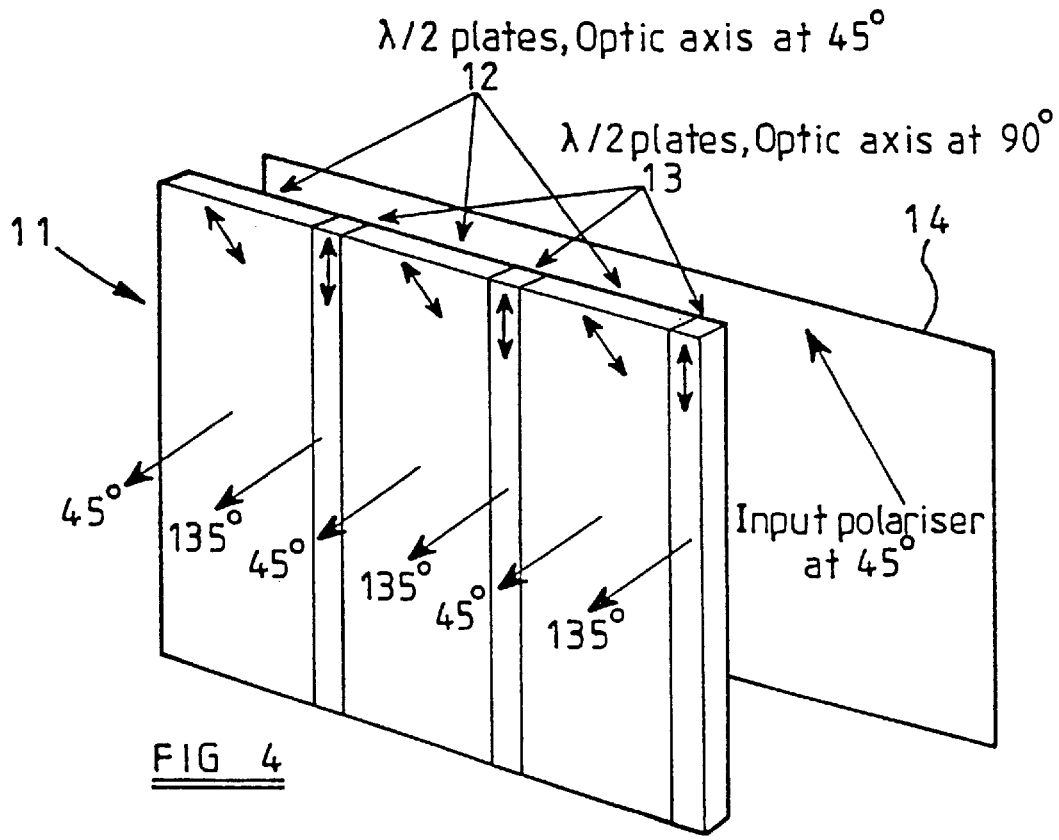
FIG. 4 illustrates an optical element and an optical device constituting embodiments of the present invention.
Figure 21:
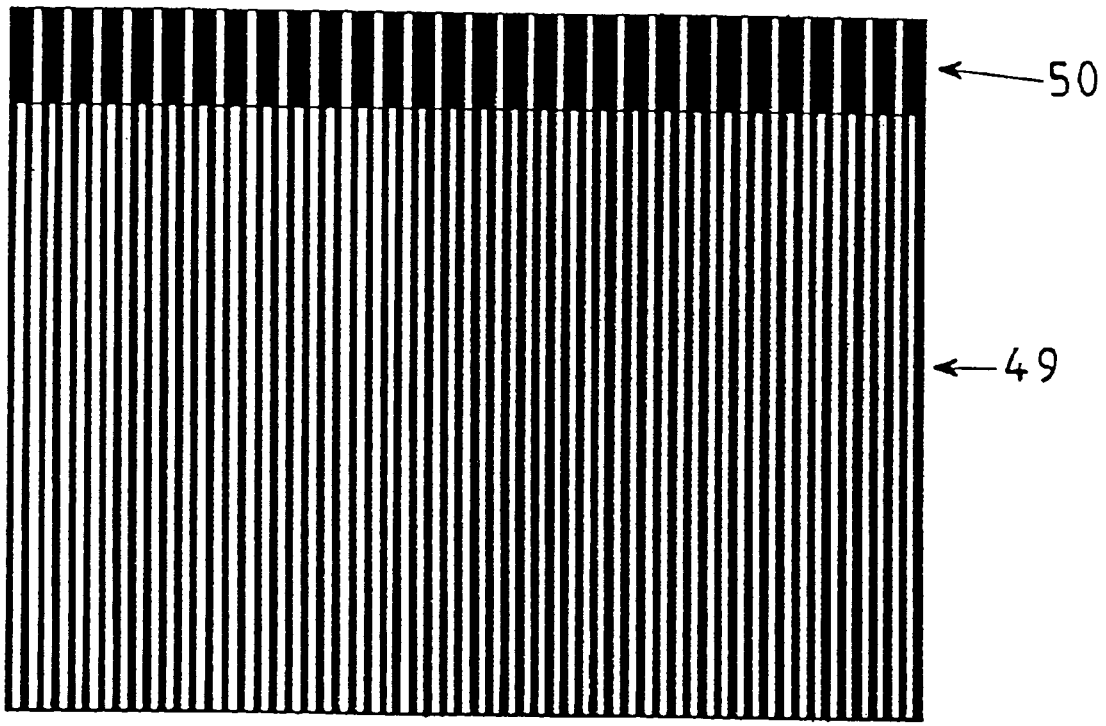

FIG. 13 comprises 13a to 13e and illustrates a method of making an optical element constituting an embodiment of the invention;

FIG. 14 comprises FIGS. 14a to 14i and illustrates a method of making an optical element constituting an embodiment of the invention;

FIG. 15 comprises FIGS. 15a to 15i and illustrates a method of making an optical element constituting an embodiment of the invention;

FIG. 16 comprises 16a to 16i and illustrates a method of making an optical element constituting an embodiment of the invention;

FIG. 17 comprises FIGS. 17a to 17i and illustrates a method of making an optical element constituting an embodiment of the invention;

FIG. 18 illustrates use of an optical element of the type shown in FIG. 4 as an inclined parallax barrier, FIGS. 19a, 19b and 20 are plan views of switchable 2D/3D autostereoscopic displays using devices of the type illustrated in FIG. 4;

FIG. 21 illustrates use of an optical element of the type shown in FIG. 4 as a parallax barrier providing viewer position indication;

FIG. 22 illustrates an optical element and an optical device constituting embodiments of the invention;

FIG. 23 is a plan view of the element and device of FIG. 22; and

Figure 24:
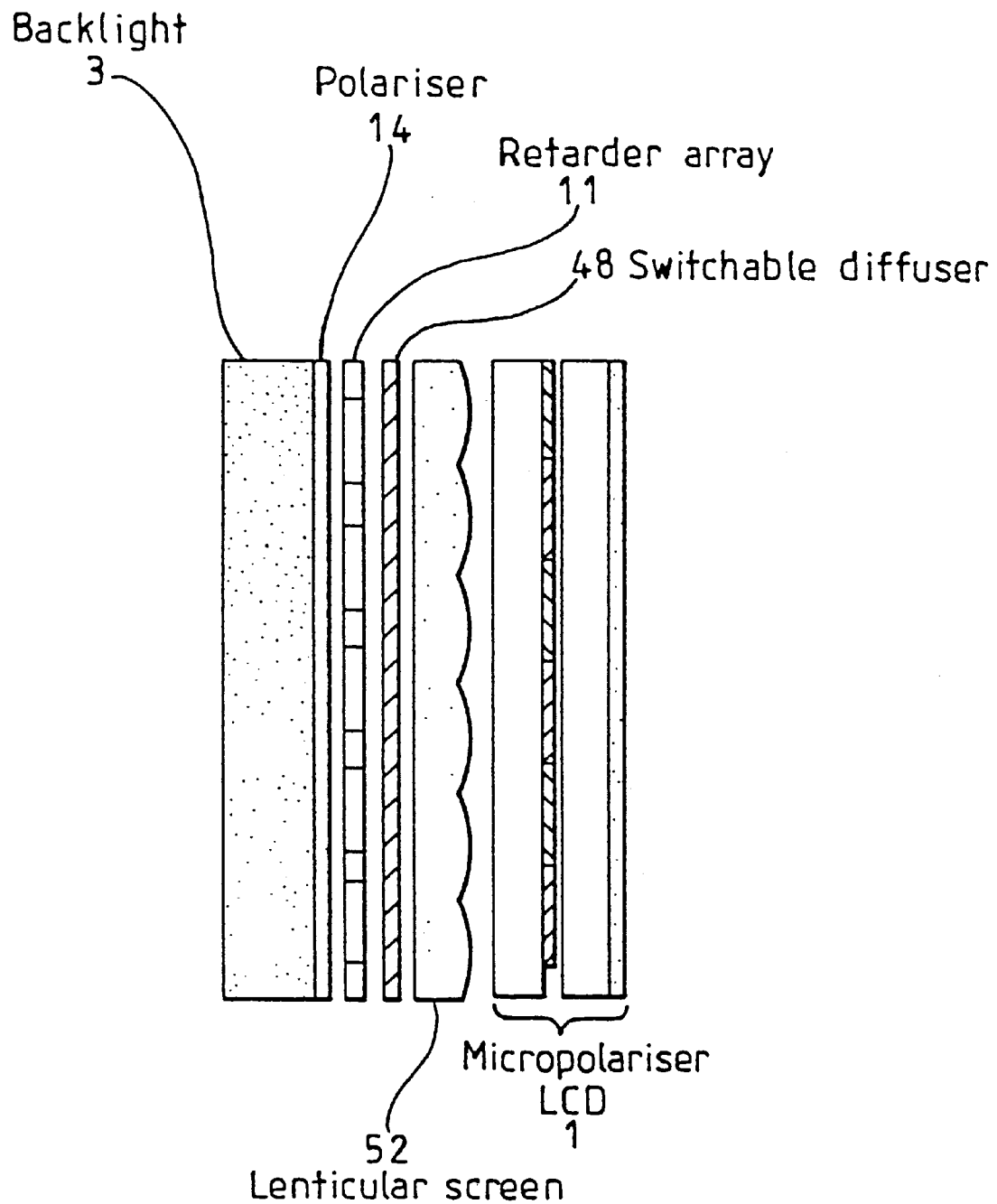
Figure 25:
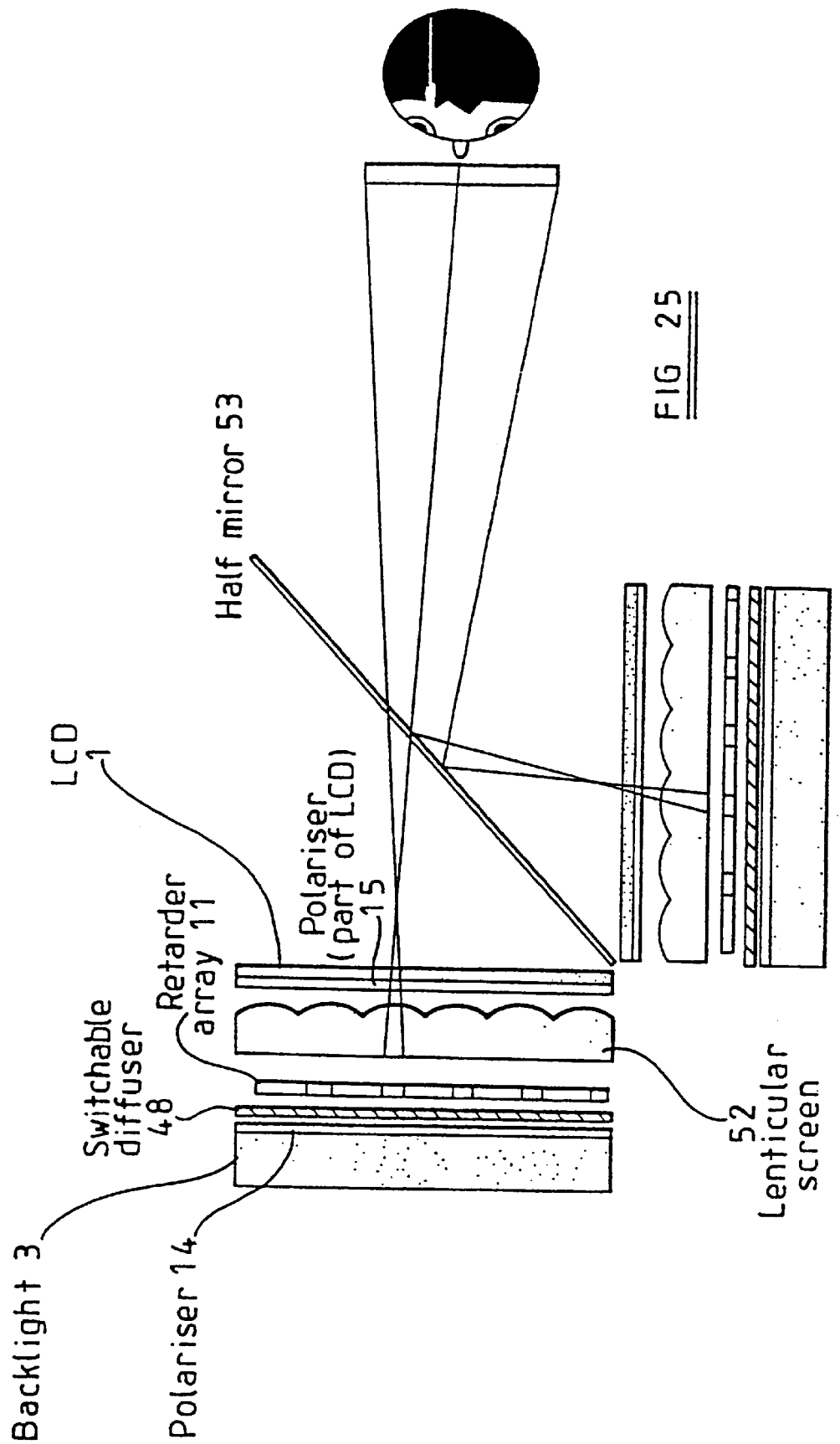
Figure 26:
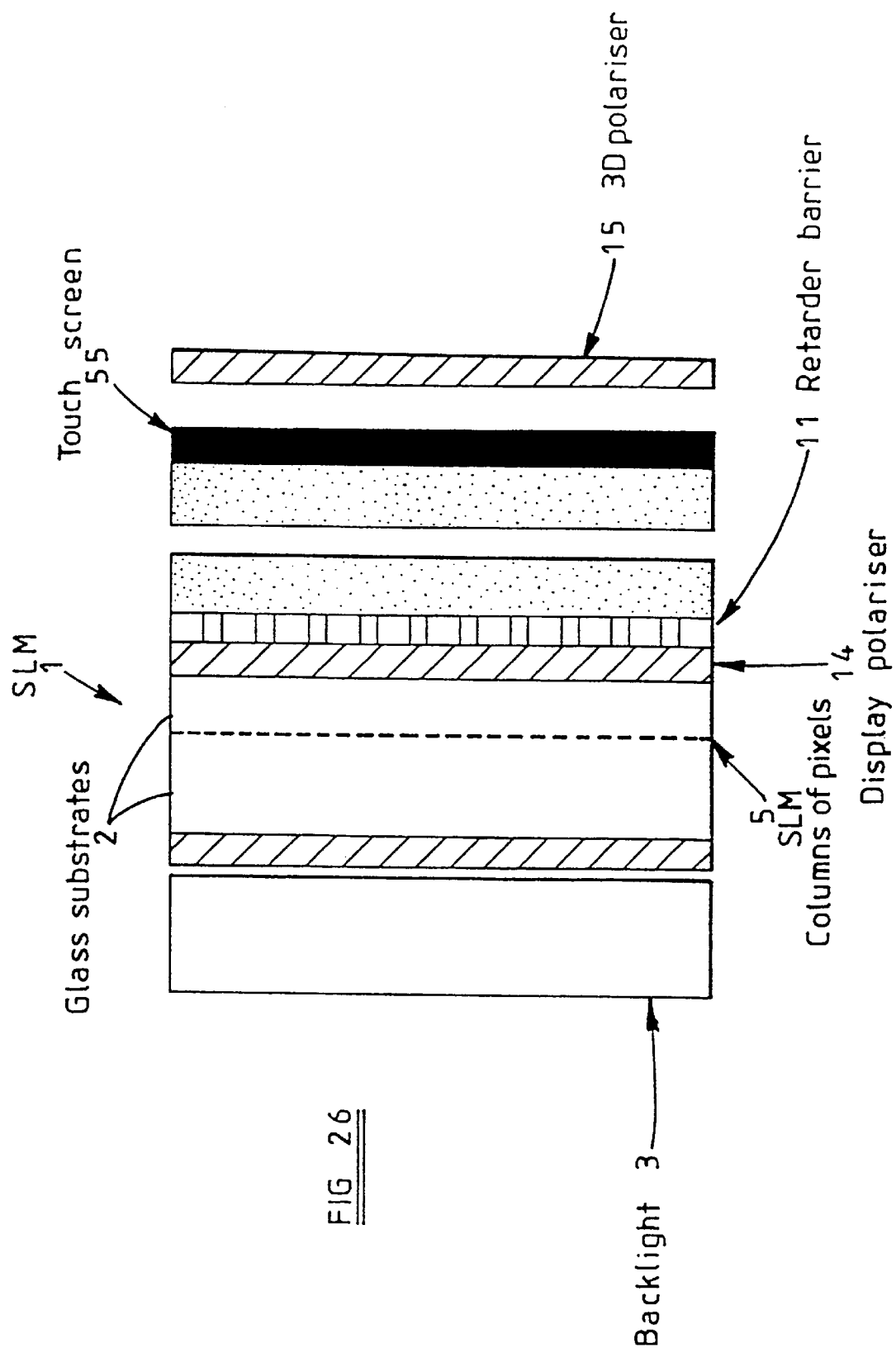

FIGS. 24, 25 and 26 are diagrammatic horizontal sectional views of autostereoscopic 3D displays using optical elements constituting embodiments of the invention.

Figure 27A:
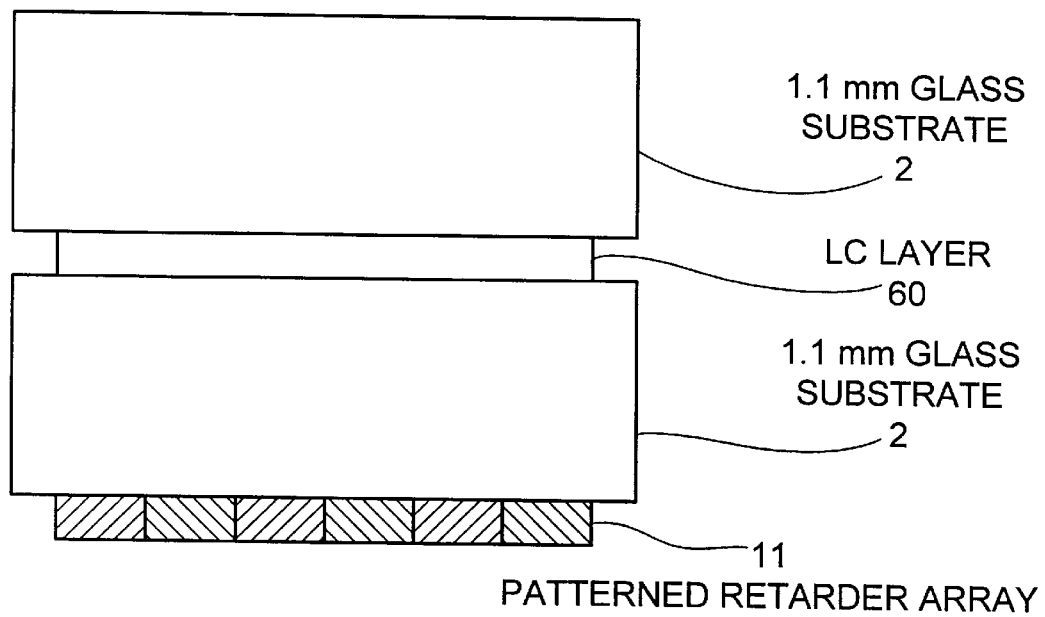
Figure 27B:
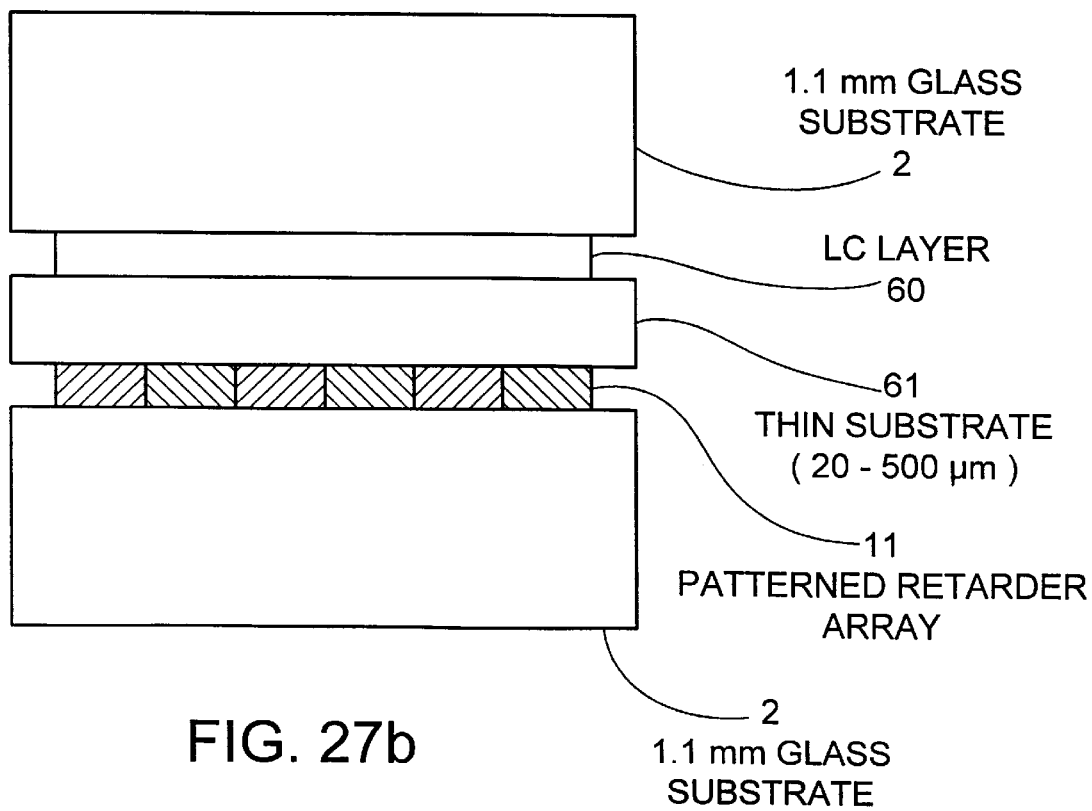

FIG. 27a is a diagrammatic horizontal sectional view of a patterned retarder and a simplified conventional LCD;

FIG. 27b is a diagrammatic horizontal sectional view of a simplified LCD with an internal retarder and thin substrate; and FIGS. 28 to 31 illustrate methods of making LCDs of the type shown in FIG. 27b.

Like reference numerals refer to like parts throughout the drawings.

FIG. 4 shows a passive polarisation modulating optical element 11 comprising a layer of birefringent material having substantially fixed birefringence magnitude. The thickness and birefringence of the layer are such that it acts as a half waveplate but with different regions acting as retarders with optic axes oriented in different directions. In particular, the element 11 has first retarders 12 and second retarders 13.

The retarders 12 and 13 comprise parallel vertical strips formed within the layer and alternating with each other. The strips 12 are of the same width and have their optic axes aligned at 45° with respect to a reference direction. The strips 13 are of the same width and have their optic axes aligned at 90° to the reference direction.

The optical element 11 shown in FIG. 4 co-operates with an input polariser 14 to form an optical device. The input polariser 14 may, for example, comprise an output polariser of a liquid crystal device. The input polariser 14 supplies linearly polarised light whose polarisation vector (i.e. transmission axis) is at 45° to the reference direction, for instance as typically used in active matrix liquid crystal devices. However, other polarisation directions appropriate to other display modes may be used with appropriate modifications to the orientations of the optic axes of the elements 12 and 13.

The polarisation vector of the light from the polariser 14 is parallel to the optic axes of the retarders 12, which therefore have substantially no effect on the direction of the polarisation vector. Accordingly, light leaving the retarders 12 has its polarisation vector at 45° to the reference direction. The optic axes of the regions 13 are aligned at 45° to the polarisation vector of the input light. Accordingly, the retarders 13 behave as half waveplates and rotate the polarisation vector of light through 90° so that the output light from the retarders 13 has its polarisation vector at 135° to the reference direction.

Figure 5:
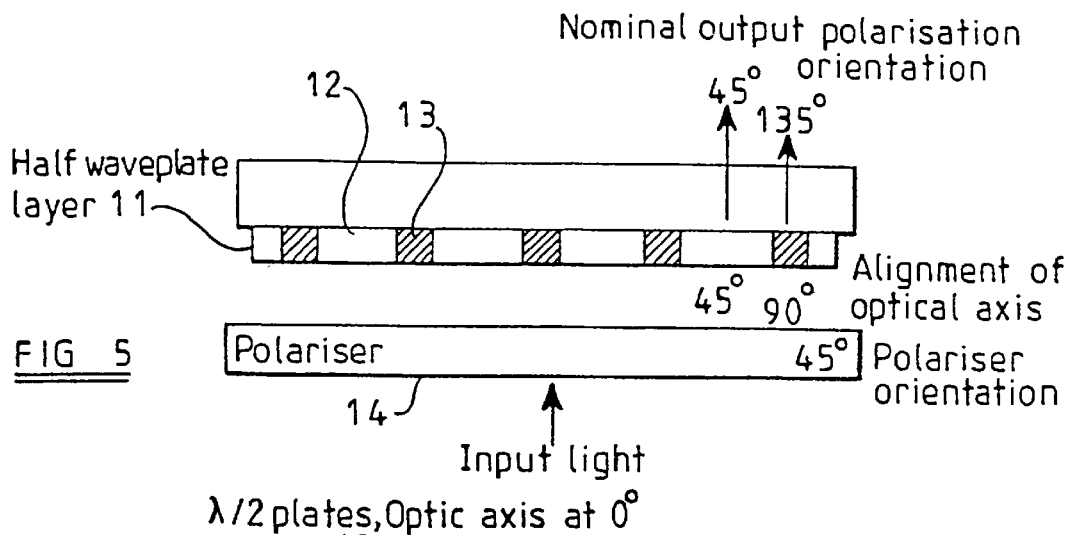
FIG. 5 is a plan view of the element and device of FIG. 4.
Figure 6:
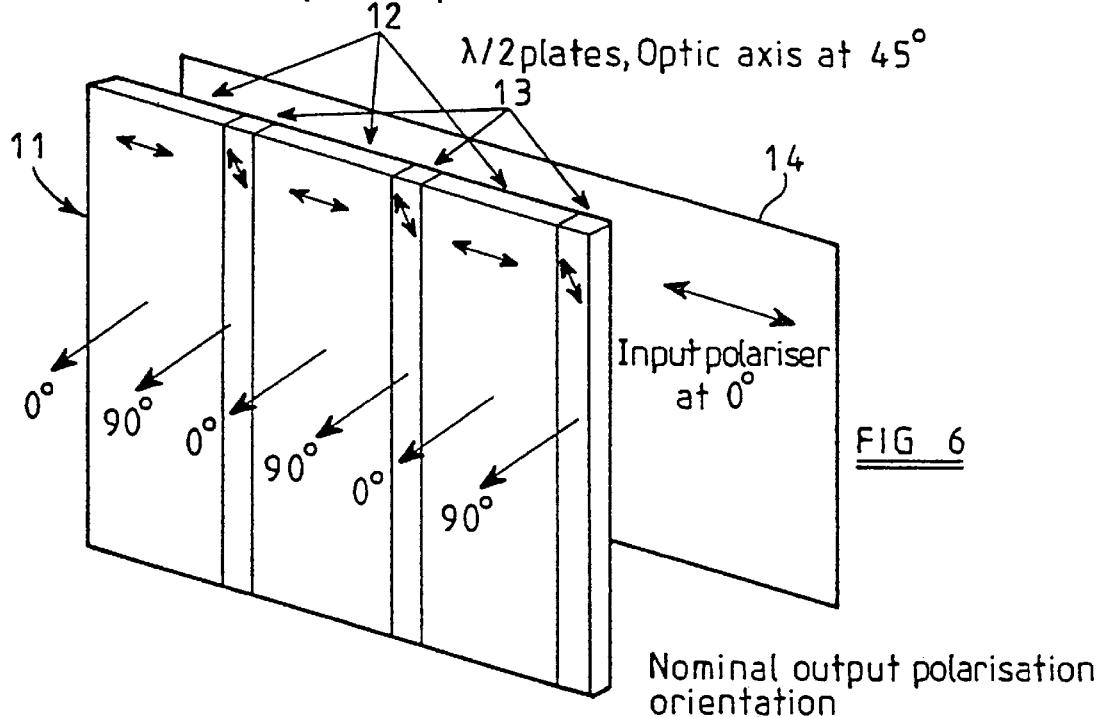
FIG. 6 illustrates an optical element and an optical device constituting embodiments of the invention.
Figure 7:
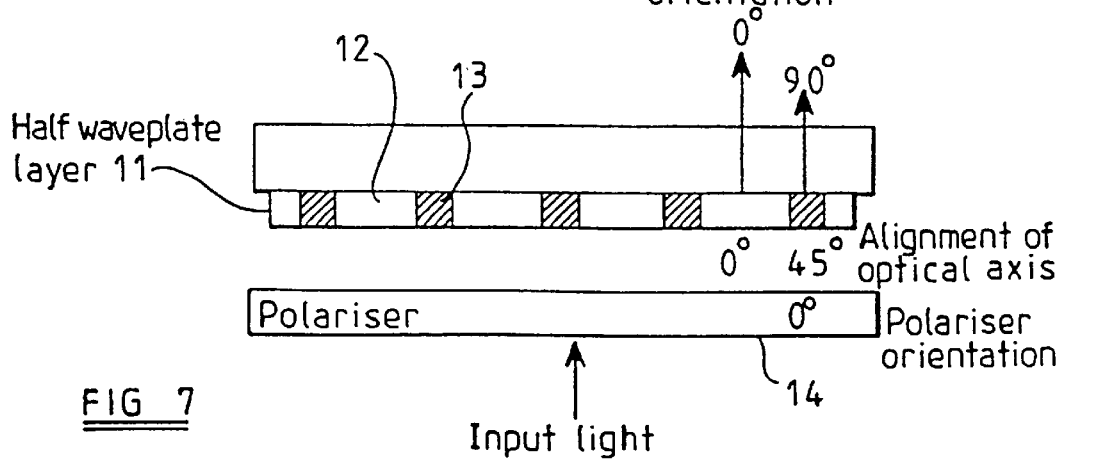
FIG. 7 is a plan view of the element and device of FIG. 6.

FIGS. 6 and 7 illustrate an arrangement which differs from that shown in FIGS. 4 and 5 in that the optic axes of the element 11 and the polarising direction of the polariser 14 are rotated through 45°. Thus, the polarisation vector of the light from the polariser 14 is at 0°, as is the light leaving the retarders 12, whereas light leaving the retarders 13 has its polarisation vector rotated to 90°.

Figure 8:
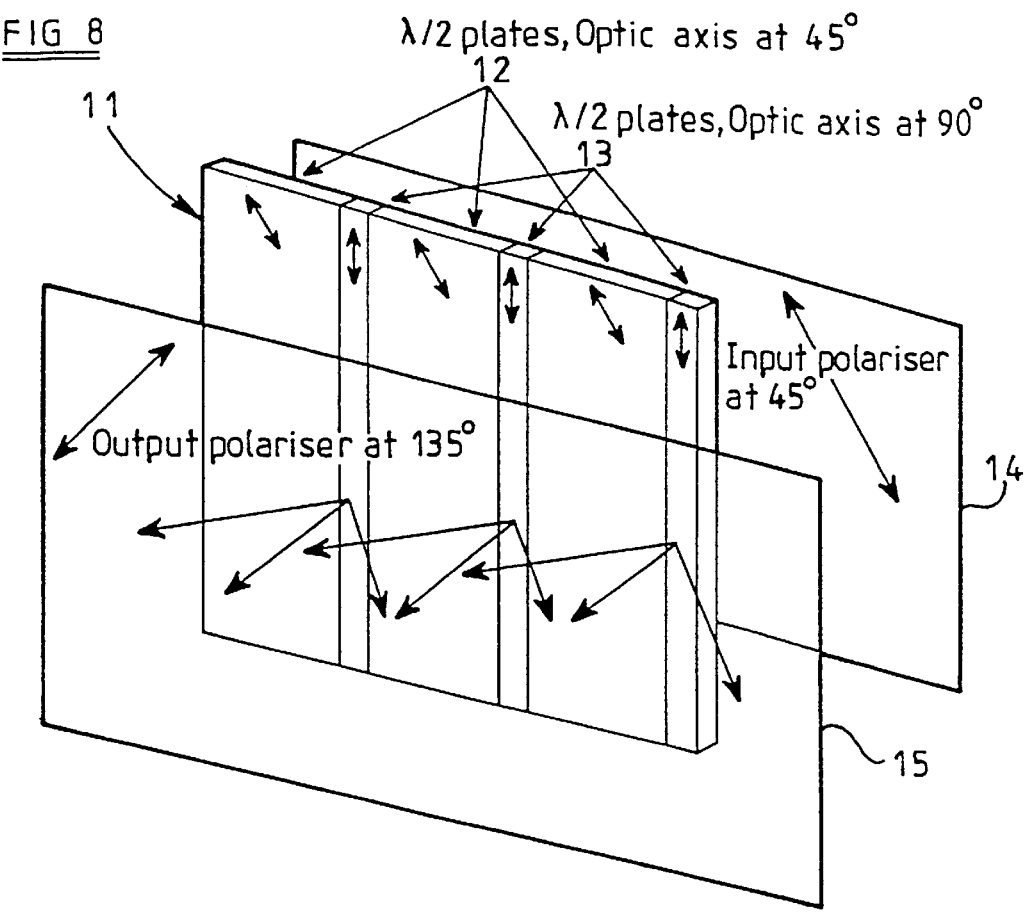
FIG. 8 illustrates an optical element and an optical device constituting further embodiments of the invention.
Figure 9:
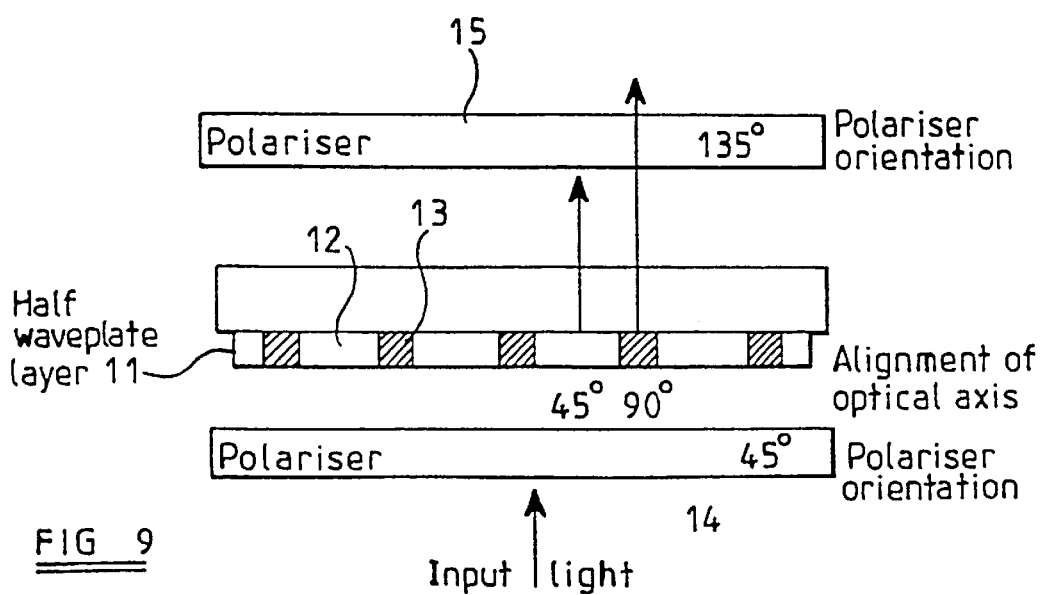
FIG. 9 is a plan view of the element and device of FIG. 8.

FIGS. 8 and 9 illustrate an optical device of the type shown in FIGS. 4 and 5 cooperating with an output polariser 15 to form a parallax barrier. The polarising direction of the output polariser 15 is orthogonal to that of the input polariser 14. The polariser 15 therefore substantially extinguishes light passing through the retarders 12 but passes light leaving the retarders 13.

Figure 10:
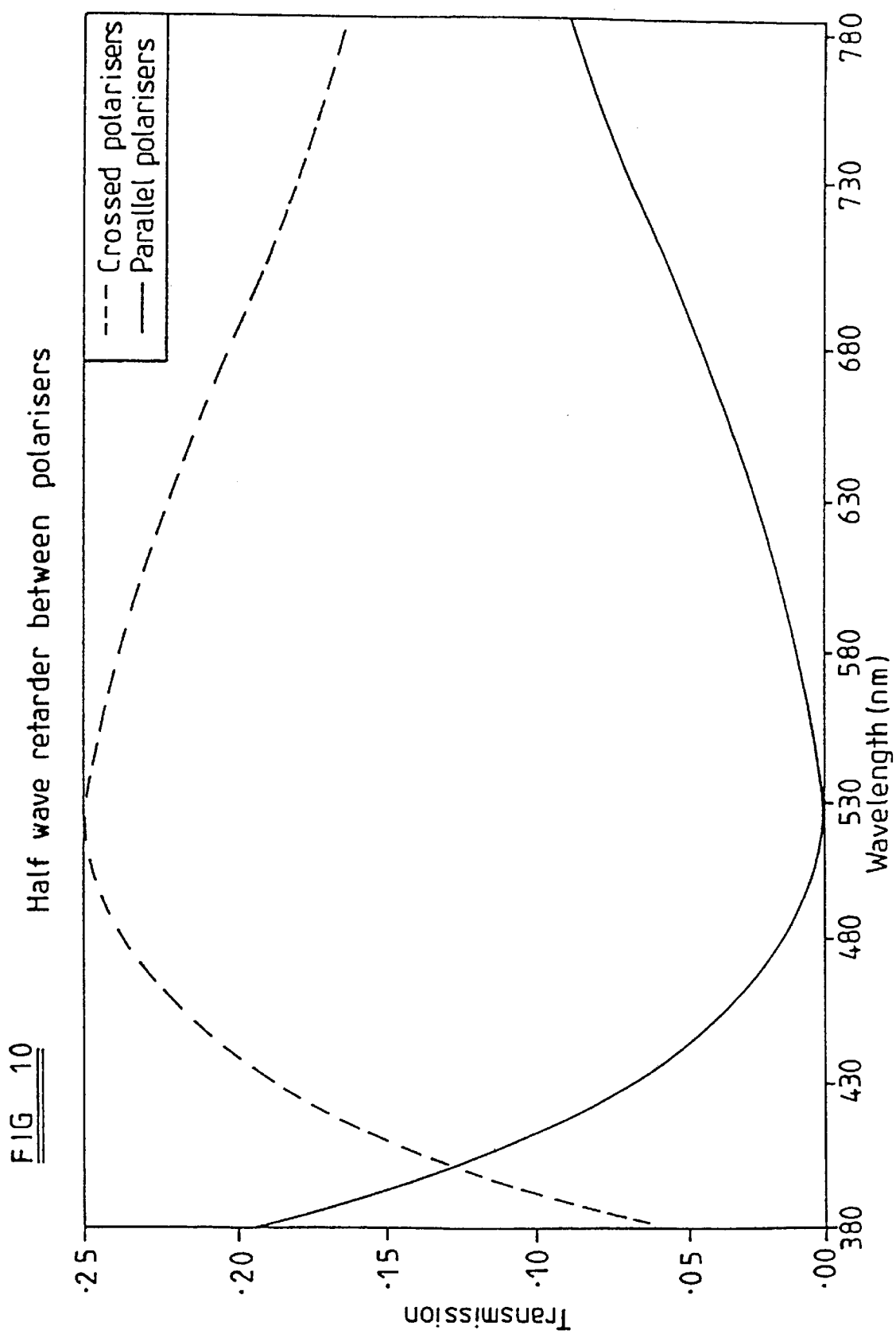
FIG. 10 illustrates graphs of transmission in arbitrary units against wavelength in nanometers for a half wave retarder disposed with its optic axis at 45° between crossed and parallel polarisers.

The polarisation rotation performed by the retarders 13 does not generally work optimally over the whole of the operating spectrum. Thus, some parts of the visible spectrum are transmitted less than others. FIG. 10 illustrates the calculated transmission of unpolarised light through the device shown in FIGS. 8 and 9 with the element 11 made of a uniaxilly birefringent material known as RM257 available from Merck (UK). With the polarising axes of the polarisers 14 and 15 orthogonal, transmission is highest by design in the region of the centre of the operating spectrum but declines towards either end of the visible spectrum. If the centre wavelength is correctly chosen, the transmitted light maintains a good white colour balance.

FIG. 10 also illustrates the performance for a device of the type shown in FIGS. 8 and 9 but with the polarising axes of the polarisers 14 and 15 parallel to each other and the optic axes of the retarders 12 and 13 interchanged. In this case, extinction of light through the retarders 12 relies on broadband half waveplate performance. The centre wavelength provides good extinction of light but the transmission substantially increases towards the edges of the spectrum. In order to ensure crosstalk levels of not more than 1%, the parallax barrier in an autostereoscopic display must provide a 100:1 contrast ratio across the visible spectrum. As illustrated in FIG. 10, this would not be achieved with parallel polarisers and polarisation rotators acting as barrier regions between slit regions of the parallax barrier.

Figure 11:
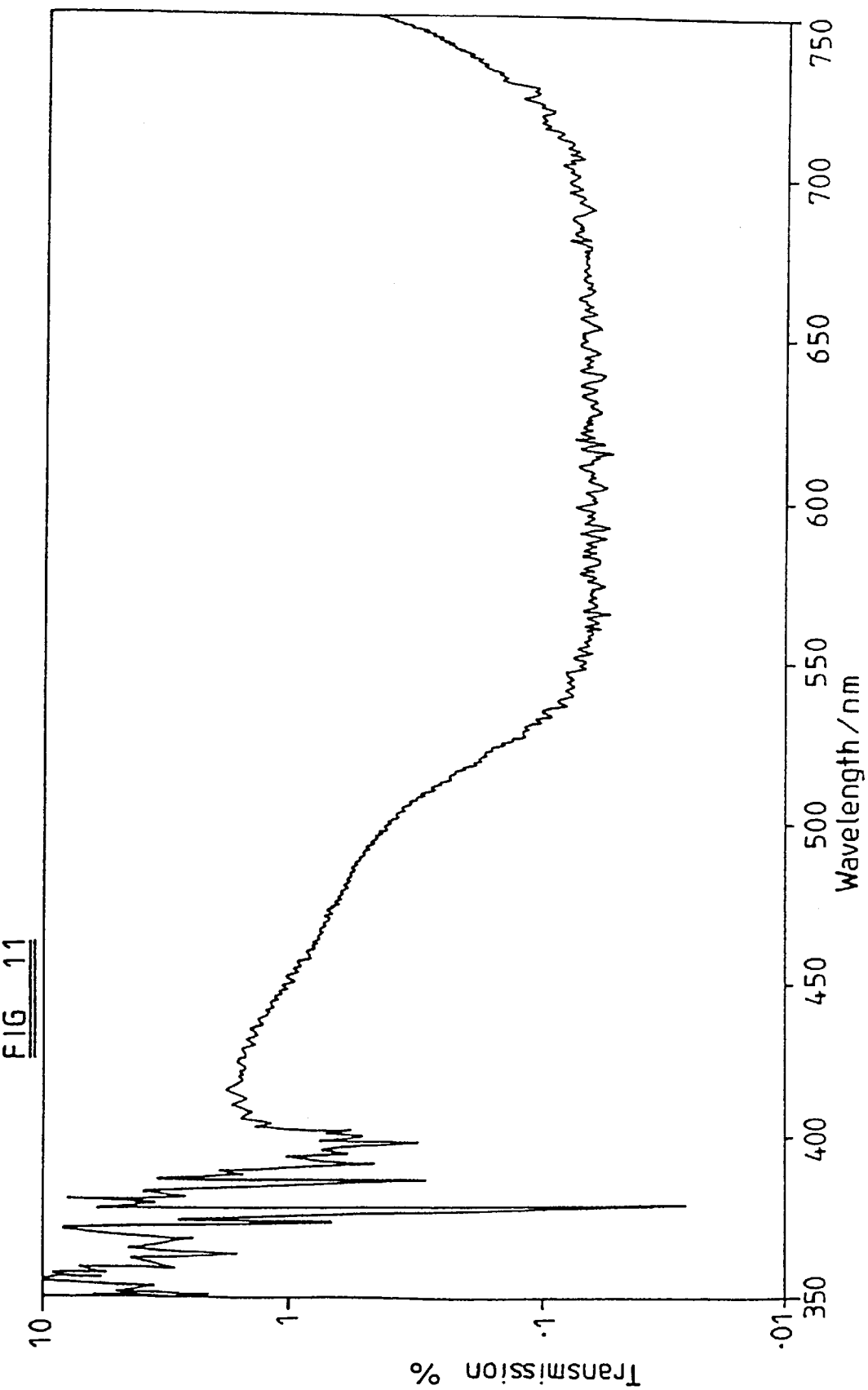
FIG. 11 is a graph of transmission in per cent against wavelength in nanometers of two crossed polarisers without any intermediate optical element.

FIG. 11 illustrates the transmission performance through two crossed polarisers without any intermediate optical element. The extinction of light is substantially improved and the desired contrast ratio is achieved throughout the whole range of wavelengths from 450 to 750 nanometers. This corresponds to the arrangement illustrated in FIG. 8 because the retarders 12 have their optic axes aligned with the polarisation vector of the input light and therefore have substantially no effect on the polarisation vector. In general, such an arrangement is preferable because it is capable of meeting the contrast ratio requirements of a parallax barrier. However, in applications where achromaticity of the transmitted light is more important than either contrast ratio or achromatic extinction of light, an arrangement of the type shown in FIGS. 8 and 9 but with the retarder optic axes in the two regions swapped and the output polariser axis rotated by 90° may be used.

The element 11 may be bonded to the input polariser 14 so as to allow accurate tolerancing of relative tilts of the strip-shaped retarders 12 and 13 and the pixel structure of an LCD of which the polariser 14 is a part. This also allows index matching of the interface so as to reduce reflections within the device. Examples of suitable materials which fulfill the requirements of the high transparency, achromaticity and thermal expansion similar to the polariser 14 and the element 11 include organic adhesives such as epoxy resins, acrylic polymers and those based on polyurethane adhesives.

Figure 1:
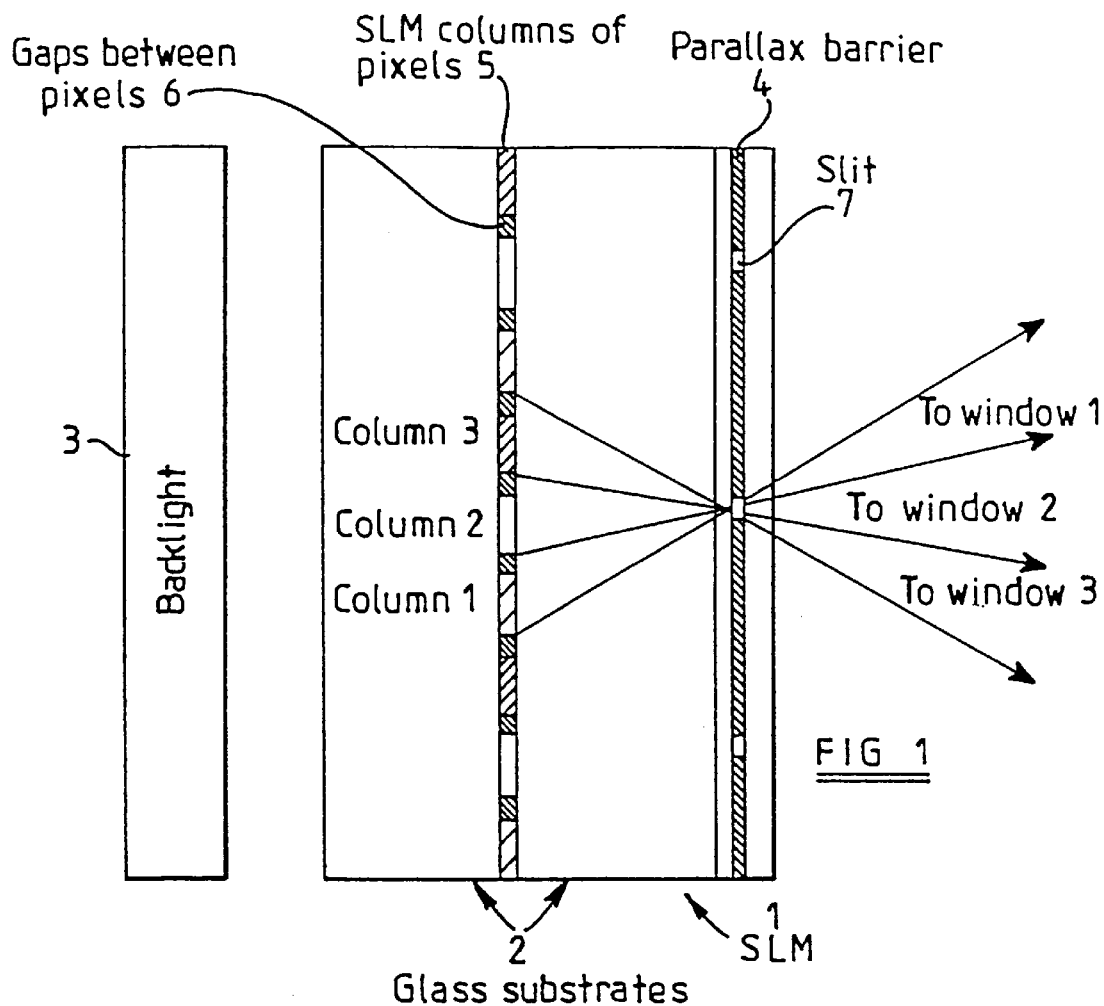
FIG. 1 is a diagrammatic horizontal sectional view of a known autostereoscopic 3D display.
Figure 2:
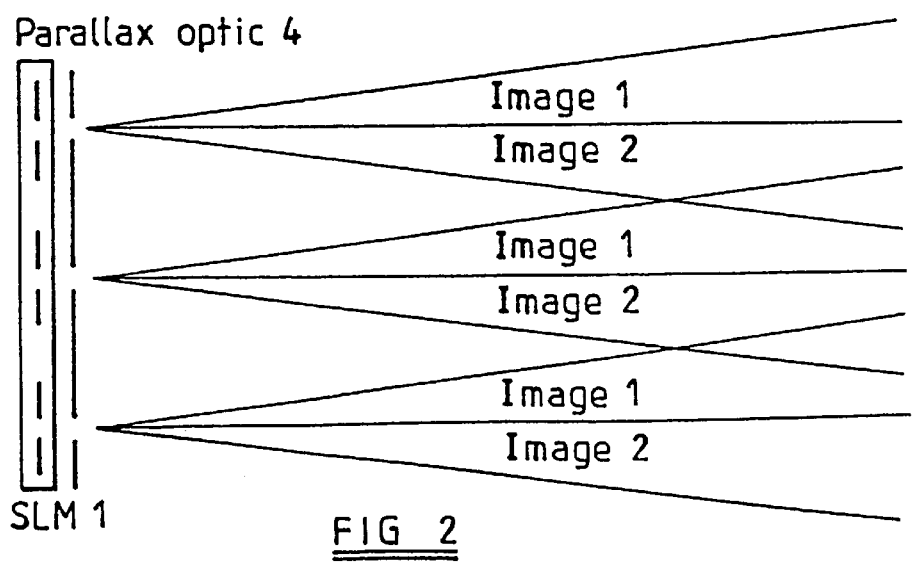
FIG. 2 is a diagrammatic plan view illustrating output light directions for a 3D display without viewpoint correction.
Figure 3:
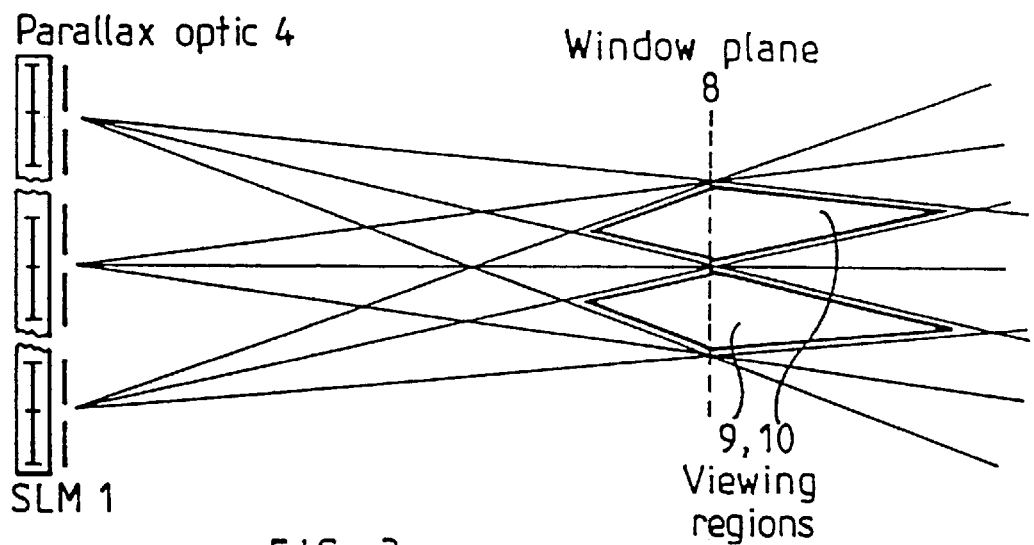
FIG. 3 is a diagrammatic plan view illustrating viewing window generation by a viewpoint corrected autostereoscopic 3D display.

The device illustrated in FIGS. 8 and 9 may be used as the parallax barrier 4 of the autostereoscopic 3D display shown in FIG. 1. The retarders 13 then act as slits of the parallax barrier whereas the retarders 12 act as the opaque regions between the slits.

When viewed from off-axis positions, light reaching the eye of an observer travels obliquely through the layer forming the element 11. Such oblique light rays experience a slightly different optical path difference because of their different orientation within the birefringent layer and the longer propagation path through the layer. Light through the barrier slits may therefore experience colour and transmission changes with off-axis viewing. However, the image contrast is substantially unaffected by viewing angle performance of the parallax barrier when the regions 12 have their optic axes aligned at either 0° or 90° to the transmission axis of the polariser 14. For 3D displays using LCDs as the SLM, the viewing angle performance may be configured to give minimum visibility of chromaticity of the white state. In some arrangements, it may be that the colouration variations tend to be worse in a direction parallel to the alignment direction of the barrier slits. Similarly, the LCD may have a viewing angle performance which is configured so that the most limited viewing direction is generally in the vertical direction. For the LCD, off-axis viewing causes degradation of contrast and colouration of the display. Thus, if the worst viewing angle of the retarder is aligned with the worst viewing angle of the SLM, the performance of the parallax barrier does not substantially affect the image appearance of the SLM.

The angular viewing properties of the display may be further improved by arranging the optic axis in the slit regions of the retarder 13 to be vertical with respect to the display orientation. Pretilt at the alignment laser surface and/or splay in the birefringent material may in turn cause an angular variation in chromaticity. The visual appearance of this variation is therefore reduced when the alignment layer direction in the slit 13 is aligned with the vertical axis of the device when the device comprises an LCD. It follows that it is also advantageous to reduce the splay in the birefingent layer.

The retarders 12 and 13 are formed in a single layer whose optical properties, apart from optic axes, are uniform throughout the layer. Further, the layer may be of substantially constant thickness. Such an arrangement allows the layer 11 to be bonded to other layers without an air gap and without the need for planarisation.

The viewing freedom of the 3D image is partly determined by the alignment of the barrier slits with the pixels of the LCD in the display shown in FIG. 1. Tilting of the barrier slits with respect to the LCD causes a fringe misalignment which results in loss of viewing freedom and potentially areas of image crosstalk on the display. This causes increased visual stress for an observer and is thus undesirable. By forming the layer 11 in contact with the polariser 14, such tilts can be substantially avoided. In particular, techniques exist for providing the desired alignment and, by forming the layer 11 integrally with the associated LCD or other device, accurate alignment can be provided during manufacture and is not substantially affected by environmental conditions, such as mechanical shocks and changes in temperature.

In order to operate a display of the type shown in FIG. 8 in the 2D mode, the output polariser 15 may be removed or otherwise disabled. In this mode, it is desirable for the patterned structure of the optic axes of the element 11 to be invisible. For instance, the retarders 12 and 13 should have the same light absorption performance in order to avoid the visibility of Moire beating with the LCD structure. Another artefact which should be avoided is diffraction from the phase structure of the parallax barrier. Such diffraction may beat with the pixel structure of the LCD to give some low contrast Moire interference effects. With the optical element 11, the diffraction efficiency of the phase structure may be reduced compared with known arrangements. The orthogonal linear polarisation states in the light from the retarders 12 and 13 do not substantially interfere with each other. The phase step between the retarder 12 and 13 is minimised because the retarders are formed in the same material with substantially the same refractive index. Additionally, there is no etched or cut edge between the regions to contribute to degradation of the 2D mode by scattering.

FIG. 12 illustrates another technique for reducing the levels of diffraction. During manufacture of the optical element 11 as described in more detail hereinafter, a mask having the appearance shown at 20 is used to define one of the alignment layer orientations shown at 21 in order to form the element. The parallax barrier slits are therefore defined by non-straight boundaries. Instead, the boundaries are, for example, of sine wave shape. Other wave shapes may be used, including those which are non-periodic or of varying period. This results in a plurality of different diffraction structures because of the different aspect ratios so that the diffraction effects are blurred. This structure also allows some vertical blurring of the diffraction structure. However, care should be taken to minimise beating of the diffraction structure vertically with the vertical pixel structure, for example by choice of and/or variation in the period of the wave shape.

FIG. 13 illustrates a first method of making the optical element 11. The element is made on a substrate 30 on which an alignment layer 31 is formed, for instance by spin coating. The alignment layer comprises a linearly photopolymerisable material, such as that described in "Surface Induced Parallel Alignment of Liquid Crystals by Linearly Polymerised Photopolymers", Schadt et al, Japanese Journal of Applied Physics, vol 31 1992, p 2155 and in EP 0 689 084. The alignment layer 31 is exposed to radiation of a first linear polarisation through a mask 32 to form exposed regions A. The unexposed regions of the layer 31 are then exposed through a mask 33 to radiation having a different linear polarisation to form the exposed regions B. Alternatively, as disclosed in "Photo-alignment and Patterning of LC Displays" Schadt, Information Display 12/97, the mask 33 may not be required as the second exposure does not substantially affect the alignment directions of regions produced with the first masked exposure. Thus, alternate regions of the alignment layer 31 provide different alignment directions, for example differing by 45° or 90°. The alignment layer 31 is then covered by a retarder layer 34, for instance by spin coating. The retarder layer 34 comprises any suitable birefringent material which may be aligned and subsequently fixed in a predetermined direction. A suitable material comprises a reactive liquid crystal polymer containing a diacrylate and/or a monoacrylate. An example of a suitable material is known as RM 257 from Merck (UK). The retarder layer 34 is then fixed or polymerised, for instance by exposure to ultraviolet radiation, so as to form the fixed retarder 35.

The optic axis of the retarder layer 34 adopts the alternate directions imposed by the underlying parts of the alignment layer 31 and so does not require selective polymerisation. Also, there is no removal of the retarder material during processing, which allows remote exposure from a broad area source and avoids the risk of sticking of the retarder material to a mask.

The substrate 30 is selected so as to minimise any birefringence which would otherwise affect the performanace of the optical element, for instance reducing contrast ratio or degrading the chromatic performance of a device. For instance, the substrate 30 may be a suitable float glass of appropriate flatness so as not to distort the fringe structure in the case of a 3D display when the optical element is disposed at or near the polariser 14. Alternatively, the substrate may be a low birefringence plastics or polymer with sufficient thermal stability to endure the (alignment layer) processing. An example of a suitable material is polyether sulphone.

FIG. 14 illustrates a second method of making the optical element. The substrate 30 is coated, for instance by spin coating, with a polyimide alignment layer 31. The polyimide may comprise a material known as PI 2555 available from Du Pont dissolved in 1:20 in a solvent comprising a mixture of N-mthyl-2-pyrrolidine and 1-methoxypropan-2-ol known as T9039 and also available from Du Pont. For instance, the layer 31 is formed by spinning in an open bowl spin coater at 4000 rpm for 30 seconds. The polyimide layer 31 is then cured by heating at 170° centigrade for two hours. The alignment layer 31 is rubbed with a soft cloth so as to impose a preferred direction and pre-tilt on the alignment layer, as indicated at A.

A layer 36 of photo-resist is formed on the alignment layer 31, for instance by spin coating. The photo-resist 36 is selectively exposed through a mask 37, for instance in the form of a chrome copy of a desired parallax barrier so that, following exposure through the mask 37, the photo-resist covers areas of the optical element which are intended to form the opaque regions between the parallax barrier slits. The exposed photo-resist is then removed.

The element is then re-rubbed so as to introduce a second different alignment of the alignment layer, for instance at 45° or 90° to the previous alignment. In some cases, it may be necessary to rub the revealed regions of the alignment layer 31 at an angle different from that which would have been necessary in the case of a previously unrubbed alignment layer so as to achieve the desired alignment direction. This may be necessary because the original alignment layer may continue to have an effect on the surface energy following the re-rubbing. Thus, a rubbing direction different from the desired alignment orientation by a magnitude of up to 20° may be required to correct for the surface energy. The re-rubbed regions are indicated at B.

The remaining photo-resist is then removed, for example by washing with acetone. A retarder layer 39, for instance of the type described hereinbefore with reference to FIG. 13, is then applied by spinning and its optic axis adopts the directions imposed by the underlying parts of the alignment layer 31. The retarder layer 39 is then fixed, for instance by exposure to ultraviolet radiation, to form the retarder 40.

FIG. 15 illustrates a third method of making the optical element. The steps illustrated in FIGS. 15a to 15e are the same as the steps illustrated in FIGS. 14a to 14e and will not be described further.

Following the step illustrated in FIG. 15e, a further alignment layer 41 is deposited on the alignment layer 31 and on the photoresist 38. The alignment layer 41 may be polyimide as described hereinbefore. The alignment layer 41 is then rubbed, for instance, as described hereinbefore to introduce a second different alignment indicated by B in FIG. 15g. The photoresist 38 is then removed, for instance as described hereinbefore, with the consequent removal of the regions of the alignment layer 41 thereabove. As shown in FIG. 15h, this leaves the alignment layer 31 partially covered by regions 42 of the alignment layer 41. Thus, the regions 42 provide the alignment direction B whereas the regions of the alignment layer 31 between the regions 42 provide the alignment direction A. The alignment layer 31 and the regions 42 are then covered with a birefringent material which is fixed as described hereinbefore to form the optical element.

FIG. 16 illustrates a fourth method of making the optical element. This method differs from that illustrated in FIG. 15 in that the alignment layer 31 is a photo-alignment layer, for instance of the type described with reference to FIG. 13. The first alignment step illustrated in FIG. 16b is performed by irradiation with linearly polarised ultraviolet light.

FIG. 17 illustrates a fifth method of making the optical device. The method shown in FIG. 17 differs from than shown in FIG. 15 in that the alignment layer 41 is a photo-alignment layer, for instance of the type described hereinbefore. The second rubbing step described with reference to FIG. 15 is replaced by irradiation with linearly polarised ultraviolet light so as to provide the desired alignment direction B as illustrated in FIG. 17g.

FIG. 18 illustrates another application of a parallax barrier of the type illustrated in FIGS. 8 and 9. The use of a parallax barrier of this type in an autostereoscopic 3D display is disclosed in C.van Berkel et al Proc.SPIE 3012 February 97. This type of display generates a greater number of views than, for instance, the display illustrated in FIG. 1 to enhance viewing freedom but proportionately reduces the resolution of the image in each view.

The optical element 11 differs from that illustrated in FIG. 8 in that the strips 12 and 13 are tilted at a small angle 45 to the columns of pixels of the display. The alignment layer direction for the strip 13 may, for instance, be set at substantially 45° to the output polariser transmission direction whereas the alignment layer direction of the strips 12 is preferably parallel or perpendicular to the display polariser transmission direction. The upper part of FIG. 18 illustrates the optical element 11 with the polariser 15 removed to provide a 2D mode of the display whereas the lower part of FIG. 18 illustrates the appearance in the 3D mode with the polariser 15 present.

FIG. 19a illustrates a rear parallax barrier type of autostereoscopic 3D display using a parallax barrier of the type illustrated in FIGS. 8 and 9 in conjunction with an SLM in the form of an LCD 1. The input polariser of the LCD 1 comprises the output polariser 15 of the parallax barrier.

In order to provide a 2D mode, the display illustrated in FIG. 19 comprises a switchable diffuser 48 disposed between the input polariser 14 and the retarder array 11 formed by the optical element. The switchable diffuser 48 may be embodied as a polymer dispersed liquid crystal (PDLC), which is switchable between a clear state and a scattering state. In the clear state, the retarder array 11 is analysed by the polariser 15 to form a parallax barrier. When the diffuser 48 is switched to the scattering state, the output polarisation of the retarder array 11 is scrambled by the diffusing effect of the diffuser 48 so that a parallax barrier is not formed and the display operates in a full resolution 2D mode.

The display illustrated in FIG. 19b differs from that shown in FIG. 19a in that the diffuser 48 is omitted and the polariser 14 is made removable to provide the 2D mode. Such an arrangement is equivalent to the polariser 15 being removable and may allow cost to be reduced.

In the arrangement shown in FIG. 19a, there may be some remnant artefact in the 2D mode, but the 3D mode is optimised. FIG. 20 illustrates an alternative arrangement in which the switchable diffuser 48 is disposed between the retarder array 11 and the polariser 15 of the LCD 1. With this arrangement, there is no remnant effect of the parallax barrier in the 2D mode, but the 3D mode may be degraded by residual scatter in the clear state of the diffuser 48.

FIG. 21 illustrates another application of a parallax barrier of the type illustrated in FIGS. 8 and 9. The barrier has a conventional portion indicated generally at 49 for cooperating with an associated SLM or the like to form the viewing windows. However, the barrier has a portion 50 with a pitch twice that of the portion 49 for cooperating with the associated SLM to provide viewer position indication. Displays of this type are disclosed in British Patent Application No. 9702259.4 and European Patent Application No. 98300826.9.

FIG. 22 illustrates another optical device, for instance for use as part of a parallax barrier, which differs from that shown in FIGS. 6 and 7 in that a uniform or unpatterned half waveplate 51 is provided on the output side of the patterned half waveplate 11. The optic axes of the strips 12 are oriented at −22.5 degrees with respect to the transmission direction of the input polariser 14 whereas the optic axes of the regions 13 are aligned at +22.5 degrees with respect thereto. The half-wave plate 51 has an optic axis aligned at 67.5° to the transmission direction of the polariser 14. The regions 12 therefore have crossed optic axes and are therefore substantially achromatic whereas the regions 13 form a combination waveplate with an overall half waveplate function with improved chromaticity performance compared with the single waveplate arrangement illustrated in FIG. 4. This is achieved at a cost of an extra waveplate 51 and the need for precise orientation of the optic axes for the regions 12 which form barrier regions when the arrangement shown in FIGS. 22 and 23 is used as a parallax barrier. Combinations of patterned and unpatterned retarders of this type are disclosed in British Patent Application Number 9725097.4.

FIG. 24 illustrates an autostereoscopic 3D display using an arrangement of elements of the type shown in FIG. 20. The LCD 1 is of the micropolariser type as disclosed in EP 0 721 132. The parallax optic comprises a lenticular screen 52 disposed between the LCD 1 and a compact illuminator. The compact illuminator comprises the backlight 3, the polariser 14, the retarder array 11 and the switchable diffuser 48. Further details of the construction and operation of this type of display are disclosed in EP 0 721 132, the contents of which are incorporated herein by reference.

FIG. 25 illustrates a beam combiner type of autostereoscopic 3D display. The LCD 1 is associated with a lenticular screen 52 as the parallax optic, behind which is disposed a compact illuminator comprising the backlight 3, the polariser 14, the switchable diffuser 48 and the retarder array 11. This arrangement is duplicated and the output light from the two display arrangements is combined by a beam combiner in the form of a half mirror 53. Each compact illuminator differs from that shown in FIG. 24 in that the positions of the switchable diffuser 48 and the retarder array 11 are exchanged so as to resemble the arrangement shown in FIG. 19. Beam combiner displays are disclosed in EP 0 602 934, the contents of which are incorporated herein by reference.

In some applications of autostereoscopic 3D displays, it may be necessary to provide a touch screen between the SLM 1 and an observer so as to permit interaction with the display. In order to minimise viewing distance, the retarder barrier 11 should be positioned between the SLM 1 and the touch screen. It may be possible to introduce a polariser into a space between the touch screen and the SLM 1 but this may result in the introduction of dirt into the display and hence degradation of image quality.

FIG. 26 illustrates an alternative arrangement and shows a front parallax barrier type of display. A touch screen 55 is disposed between the retarder barrier 11 and the 3D polariser 15. The polariser 14 is formed by the display polariser of the SLM 1.

In this arrangement, because the touch screen 55 is disposed between the barrier 11 and the polariser 15, its birefringence must be taken into consideration so as not to degrade the 3D mode of the display. For instance, the touch screen 55 may comprise a sandwich of transparent electrodes and a spacer plastic mounted on a glass substrate. Any birefringence in the touch screen 55 then manifests itself as a loss of contrast and colouration in the 3D mode of operation.

The problem of birefringence in the touch screen 55 may be removed or reduced in at least two ways. In the first way, the touch screen 55 may be made of low birefringence plastic so that there is no substantial degradation of the polarisation output of the barrier 11. In the second way, if the touch screen 55 has a non-zero but uniform retardation, the optic axis of the touch screen 55 may be aligned with the polariser 15 so that there is no substantial modification of polarisation, at least for on-axis illumination.

If the retardation of the touch screen 55 is controllable, then the touch screen itself may be used as a uniform waveplate in an achromatic configuration, for instance as illustrated at 51 in FIG. 23. Thus, in such an arrangement, the number of extra components and the cost of such an achromatic arrangement are reduced and display performance may be enhanced.

FIG. 27a shows, in simplified form, a conventional LCD comprising glass substrates 2 and a liquid crystal layer 60 with a patterned retarder array 11 disposed externally of the lower substrate 2. When use in an autostereoscopic 3D display, the optimum viewing distance, for an LCD of a given pixel pitch and size, is determined by the separation between the parallax barrier formed by the array 11 and the pixel plane formed in the layer 60. This separation is generally determined by the thicknesses of the LCD substrate 2, a polariser (not shown in FIG. 27a), and any protective or anti-reflection coatings which may be present. For a substrate thickness of 1.1 mm, the separation is approximately 1.3 mm. The thickness of the substrate 2 may be reduced to 0.7 mm giving a separation of approximately 0.9 mm.

Where the separation is required to be smaller than this, it is possible to use a thinner substrate 2. However, manufacture of an LCD with one very thin substrate is difficult and may not produce a sufficiently rugged device.

FIG. 27b illustrates an LCD which differs from that shown in FIG. 27a in that the array 11 is disposed internally of the conventional substrates 2 and is separated from the liquid crystal layer 60 by a thin substrate, for instance having a thickness between 20 and 500 micrometers and made of glass. Such an arrangement allows a relatively small separation between the pixel plane and the parallax barrier to be provided while retaining substrates 2 of conventional thickness so as to provide mechanical rigidity.

Figure 28:
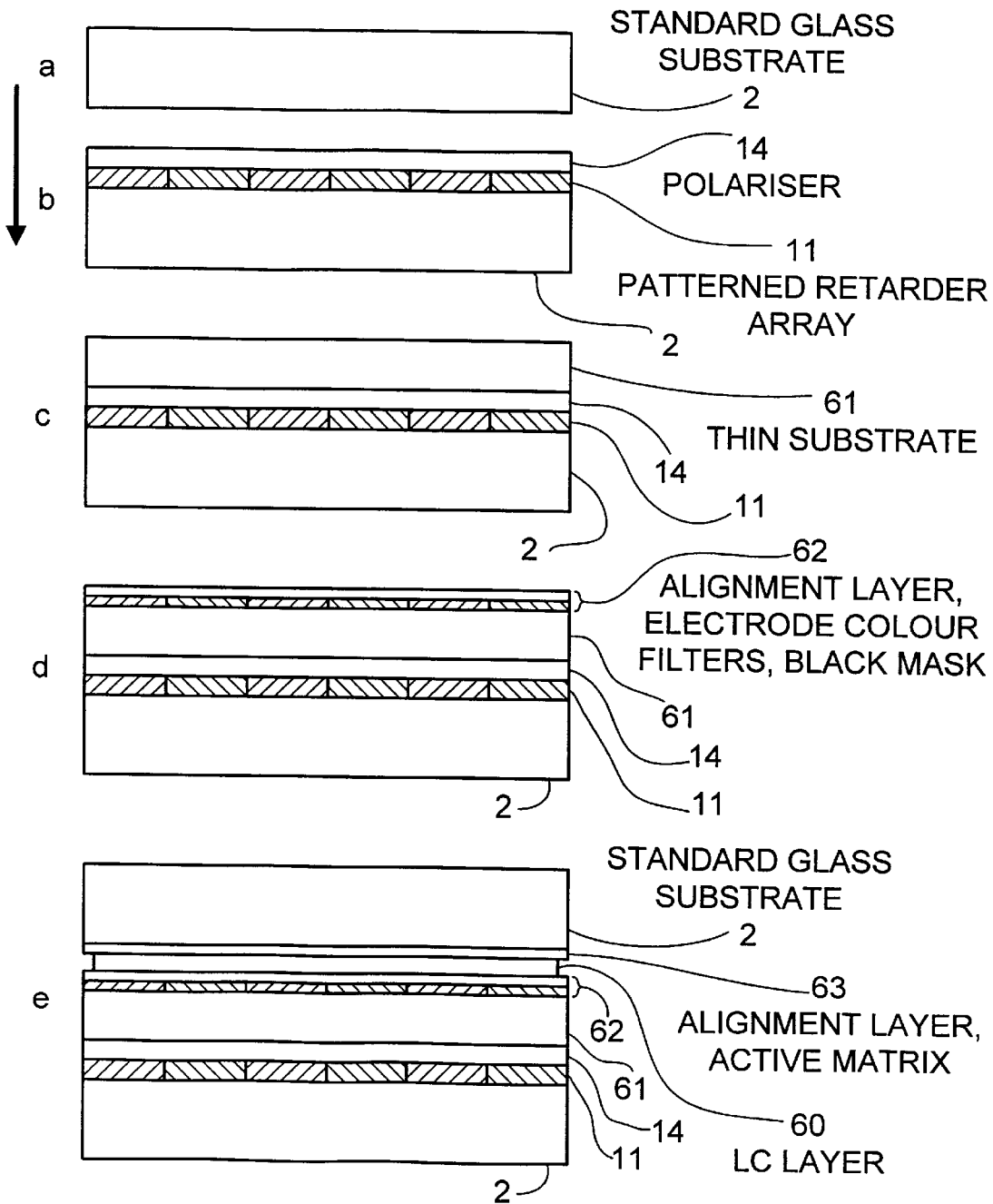

FIG. 28 illustrates a method of making such a device. A standard glass substrate 2 is provided at a. The patterned retarder array 11 and the polariser 14 are formed on the substrate 2 as shown at b. The polariser may be of a material compatible with processing steps in the formation of an LCD, for instance as disclosed in British Patent Application No. 9713627.9. The thin substrate 6 is disposed on the polariser 14 as shown at c and other components such as an alignment layer, an electrode, colour filters and black mask 62 are formed on the substrate 61 as shown at d. A further standard glass substrate 2 is provided with, for example, an alignment layer and an active matrix 63 and, together with the substrate 2 and associated elements 11, 14, 61, 62 forms a cell containing the liquid crystal layer 60 as illustrated at e.

Figure 29:
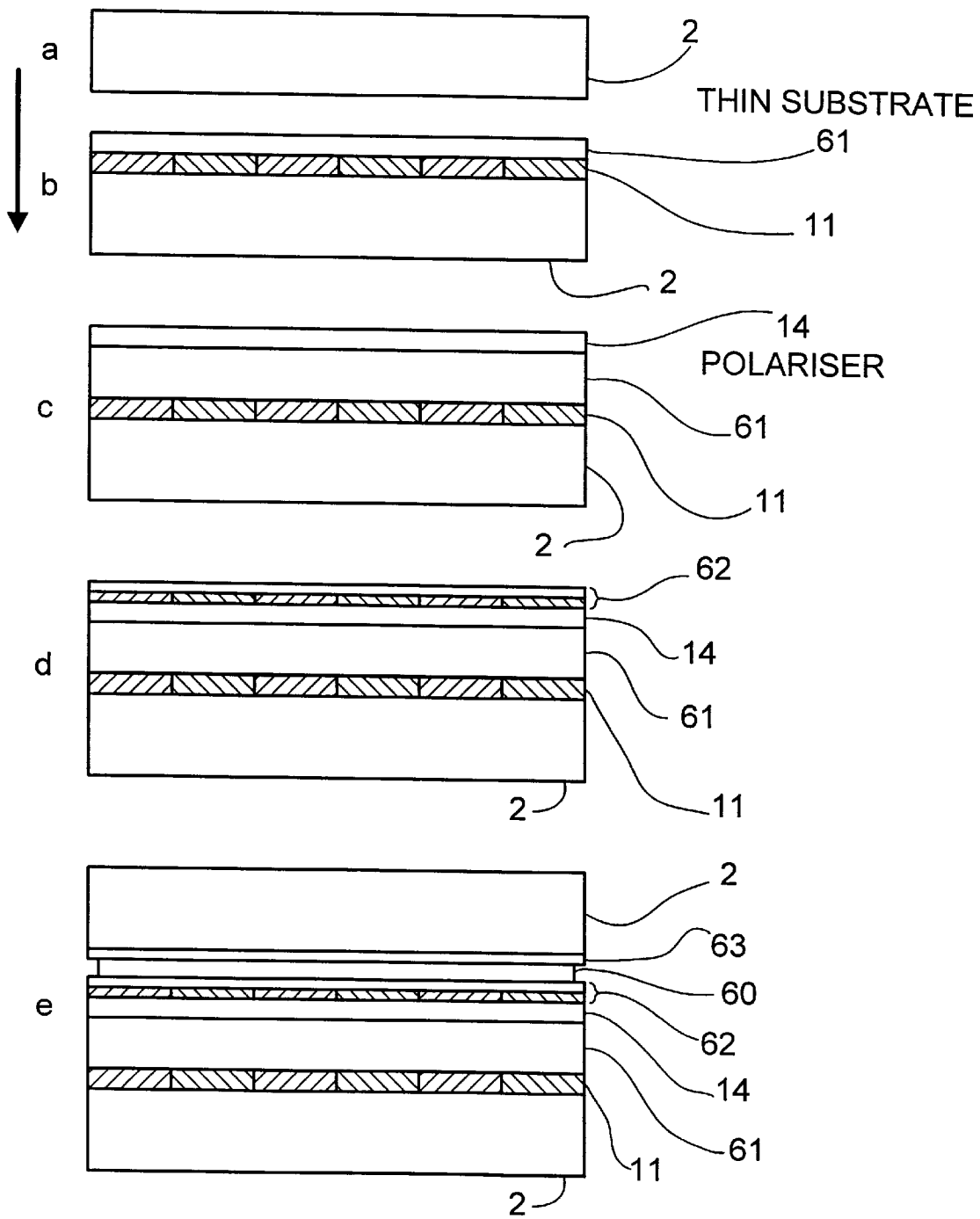

FIG. 29 illustrates a method which differs from that shown in FIG. 28 in that the polariser 14 is formed on the opposite side of the thin substrate 61 from the array 11.

Such methods allow processors such as spinning and rubbing of the alignment layer to be performed on a relatively rugged base rather than on the thin substrate 61 alone. Thus, a relatively small separation between the pixel plane and the parallax barrier may be provided while using conventional manufacturing techniques to form a rugged device.

Figure 30:
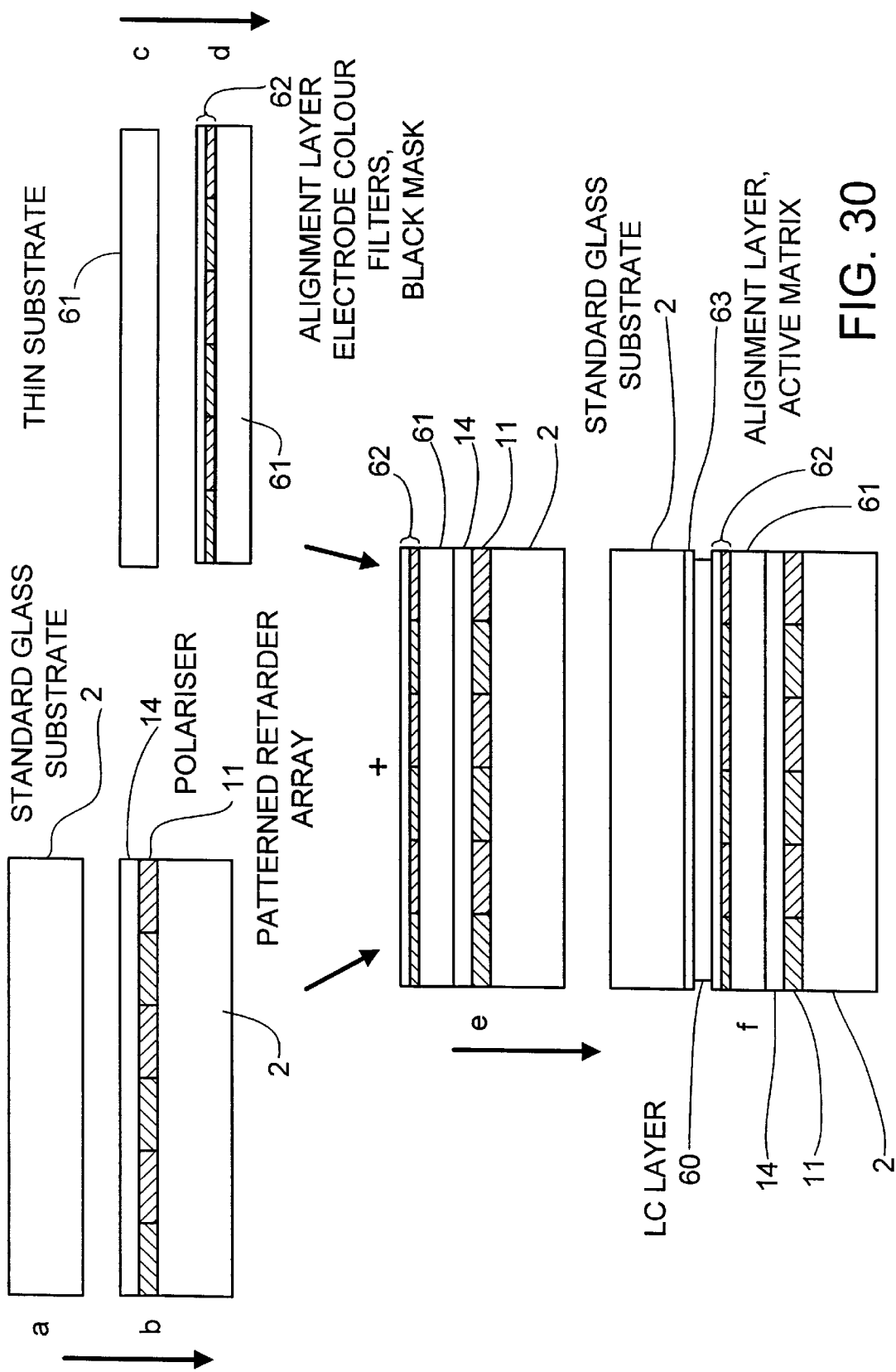

FIG. 30 illustrates a method in which process steps are performed on the thin substrate 61. At a, a standard glass substrate 2 is provided and, at b, the patterned retarder array 11 and the polariser 14 are formed on the substrate 2. At c, the thin substrate 61 is provided and, at d, the alignment layer, electrode, colour filters and black mask 62 are formed on the thin substrate 61. The assemblies formed at b and d are then brought together as shown at e with the thin substrate 61 on the polariser 14. The device is then completed by forming the alignment layer and active matrix 63 on another standard glass substrate 2 and providing the liquid crystal layer 60.

Figure 31:
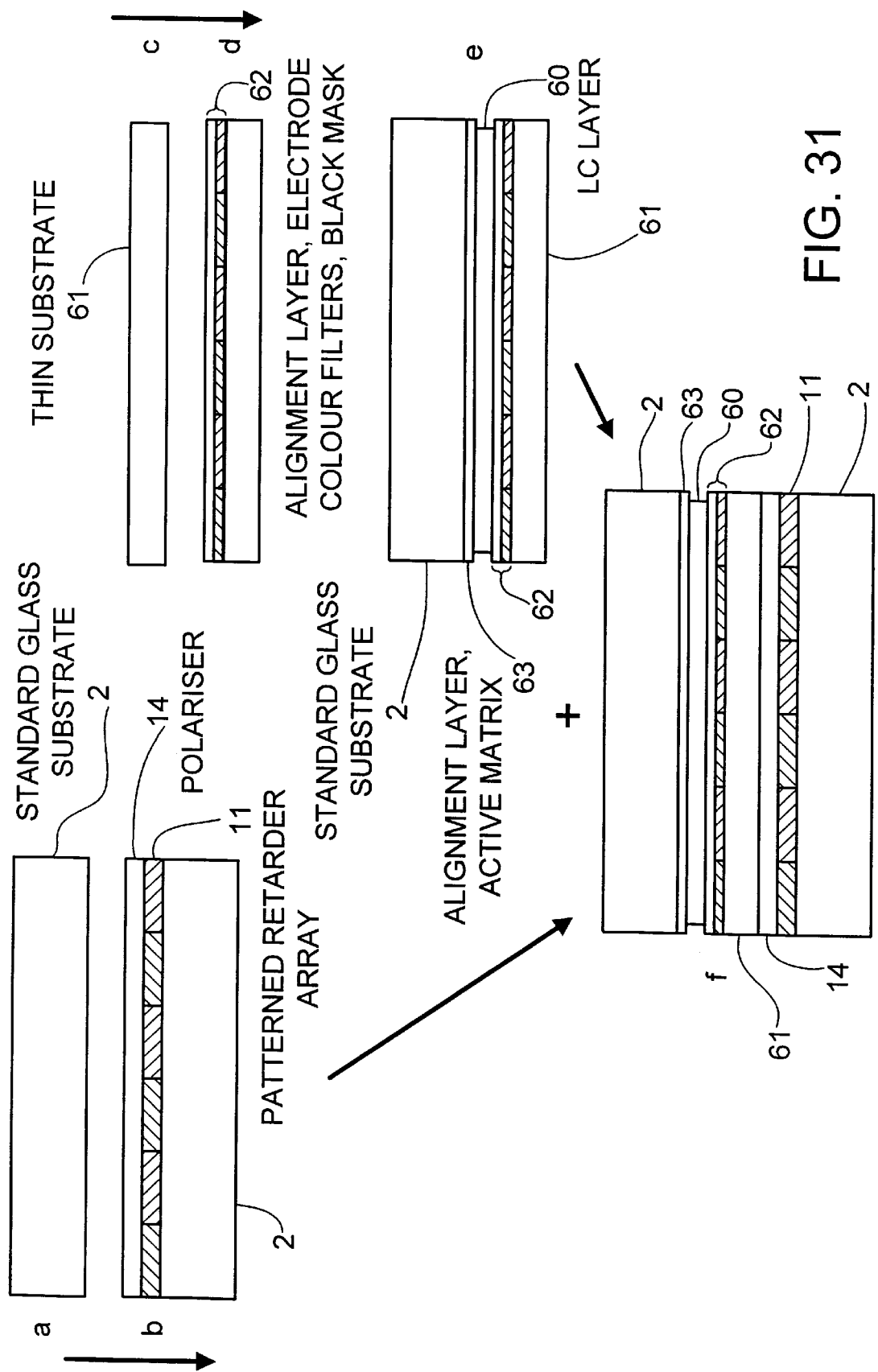

FIG. 31 illustrates a method in which the steps a to d are the same as in the method shown in FIG. 30. However, as shown at e, the cell containing the liquid crystal 60 is formed between the upper standard glass substrate 2 and the thin substrate 61, after which the lower substrate 2 with the array 11 and the polariser 14 are attached to the lower surface of the substrate 61 as shown at f.

The main substrates 2 may be formed of a plastics material provided it has sufficient endurance to heat and solvents to be compatible with the fabrication of the rest of the device. The main substrate is preferably isotropic or at least of substantially uniform birefringence.

What is claimed is:

1. A passive polarisation modulating element comprising:
    an alignment layer comprising at least one first region having a first alignment direction and at least one second region having a second alignment direction different from the first alignment direction; and
    a layer of birefringent material disposed on and aligned by the alignment layer, the birefringent layer having substantially fixed magnitude of birefringence and comprising
        at least one first retarder overlying the at least one first region and having an optic axis aligned in a first direction; and
        at least one second retarder overlying the at least one second region and having an optic axis aligned in a second direction different from the first direction.

2. A passive polarisation modulating element as claimed in claim 1, wherein the at least one first retarder comprises a plurality of first retarders, the at least one second retarder comprises a plurality of second retarders, and the first and second retarders are arranged as a regular array.

3. A passive polarisation modulating element as claimed in claim 2, wherein the first and second retarders comprise first and second strips which alternate with each other.

4. A passive polarisation modulating element as claimed in claim 3, wherein the first strips have a first width and the second strips have a second width less than the first width.

5. A passive polarisation modulating element as claimed in claim 1, wherein the first and second retarders have a retardance of $(2m+1)\lambda/2$ between propagation along the fast and slow axes, where m is an integer and $\lambda$ is a wavelength of light.

6. A passive polarisation modulating element as claimed in claim 1, wherein the second alignment direction is at substantially 45° to the first alignment direction.

7. A passive polarisation modulating element as claimed in claim 1, wherein the birefringent material comprises a reactive mesogen.

8. An optical device comprising an element as claimed in claim 1 and a linear polariser for passing light polarised at a predetermined angle with respect to the first optic axis.

9. An optical device as claimed in claim 8, wherein the predetermined angle is substantially equal to 0° or 90°.

10. An optical device as claimed in claim 8, wherein the polariser comprises part of a liquid crystal device.

11. An optical device as claimed in claim 10, wherein the liquid crystal device comprises first and second substrates and a liquid crystal layer, the optical element is disposed between the first substrate and the liquid crystal layer, a third substrate is disposed between the optical element and the liquid crystal layer, and the third substrate is substantially thinner than the first substrate.

12. A method of making a passive polarisation modulating optical element, comprising forming an alignment layer, providing at least one first region of the alignment layer with a first alignment direction, providing at least one second region of the alignment layer with a second alignment direction different from the first alignment direction, disposing on the alignment layer a layer of birefringent material whose optic axis is aligned by the alignment layer, and fixing the optic axis of the birefringent layer.

13. A method as claimed in claim 12, in which the at least one first region comprises a plurality of first regions, the at least one second region comprises a plurality of second regions, and the first and second regions are arranged as a regular array.

14. A method as claimed in claim 13, in which the first and second regions comprise first and second strips which alternate with each other.

15. A method as claimed in claim 14, in which the first strips have a first width and the second strips have a second width less than the first width.

16. A method as claimed in claim 12, in which the birefringent layer has a thickness for providing a retardance of $(2n+1)\lambda/2$ between propagation along the fast and slow axes, where n is an integer and $\lambda$ is a wavelength of light.

17. A method as claimed in claim 12, in which the second alignment direction is at substantially 45° to the first alignment direction.

18. A method as claimed in claim 12, in which the birefringent material comprises a reactive mesogen.

19. A method as claimed in claim 12, in which the fixing is performed by irradiation.

20. A method as claimed in claim 19, in which the fixing is performed by ultraviolet irradiation.

21. A method as claimed in claim 12, in which the alignment layer comprises polyimide.

22. A method as claimed in claim 12, in which the alignment layer comprises a linearly photopolymerisable polymer, the alignment layer is masked to reveal the or each first region, the or each first region is exposed to radiation having a first linear polarisation, the alignment layer is masked to reveal the or each second region, and the or each second region is exposed to radiation having a second linear polarisation different from the first linear polarisation.

23. A method as claimed in claim 12, in which the alignment layer comprises a linearly photopolymerisable polymer, the alignment layer is masked to reveal the or each first region, the or each first region is exposed to radiation having a first linear polarisation, the alignment layer is unmasked, and the or each first region and the or each second region are exposed to radiation having a second linear polarisation different from the first linear polarisation.

* * * * *